US008719884B2

(12) United States Patent
Sharon et al.

(10) Patent No.: US 8,719,884 B2
(45) Date of Patent: May 6, 2014

(54) VIDEO IDENTIFICATION AND SEARCH

(71) Applicant: Microsoft Corporation, Redmond, WA (US)

(72) Inventors: Eitan Sharon, San Mateo, CA (US); Eran Borenstein, Oakland, CA (US); Mehmet Tek, Santa Clara, CA (US); Achiezer Brandt, San Mateo, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/666,735

(22) Filed: Nov. 1, 2012

(65) Prior Publication Data

US 2013/0326573 A1    Dec. 5, 2013

Related U.S. Application Data

(60) Provisional application No. 61/655,622, filed on Jun. 5, 2012.

(51) Int. Cl.
*H04N 7/173* (2011.01)

(52) U.S. Cl.
USPC ............................................. 725/94; 725/115

(58) Field of Classification Search
USPC ............................................. 725/93–94, 115
See application file for complete search history.

(56) References Cited

U.S. PATENT DOCUMENTS

| | | | |
|---|---|---|---|
| 8,059,915 B2 | 11/2011 | Sharon et al. | |
| 8,150,096 B2 | 4/2012 | Alattar | |
| 8,176,509 B2 | 5/2012 | Folgner et al. | |
| 2008/0118107 A1 | 5/2008 | Sharon et al. | |
| 2008/0120290 A1 | 5/2008 | Delgo et al. | |
| 2008/0120328 A1 | 5/2008 | Delgo et al. | |
| 2008/0292188 A1 | 11/2008 | Ettan et al. | |
| 2009/0074235 A1* | 3/2009 | Lahr et al. | 382/100 |
| 2009/0083228 A1 | 3/2009 | Shatz et al. | |
| 2009/0165044 A1* | 6/2009 | Collet et al. | 725/38 |
| 2010/0070523 A1 | 3/2010 | Delgo et al. | |
| 2010/0118191 A1 | 5/2010 | Chevallier et al. | |
| 2010/0250585 A1 | 9/2010 | Hagg et al. | |
| 2010/0329547 A1 | 12/2010 | Cavet | |
| 2012/0008821 A1 | 1/2012 | Sharon et al. | |

OTHER PUBLICATIONS

Gruhne, et al., "Using the MPEG Query Format for Cross-Modal Identification", In Journal of Multimedia, vol. 4, No. 5, Oct., 2009, 11 pages.
Lee, et al., "Robust Video Fingerprinting for Content-Based Video Identification", In Proceedings of IEEE Transactions on Circuits and Systems for Video Technology, vol. 18, Issue 7, Jul. 2008, 6 pages.

* cited by examiner

*Primary Examiner* — Hunter B Lonsberry
(74) *Attorney, Agent, or Firm* — Bryan Webster; Doug Barker; Micky Minhas

(57) ABSTRACT

Systems and methods for identifying and searching video are disclosed. A video search and identification system includes a catalog representing relationships between video, data and/or objects to enable querying and search based on visual representations of video as well as data or other information associated with the video. In one example, the catalog includes video nodes, metadata nodes and card nodes, although additional or fewer node types may be used. A visual-based video identification system is provided to identify content in video sources. An unidentified video source is accessed and visual fingerprints of one or more frames are generated as query signatures for matching against a base set of known signatures. Confidence measures are generated at the bit level to assist in query signature processing.

20 Claims, 13 Drawing Sheets

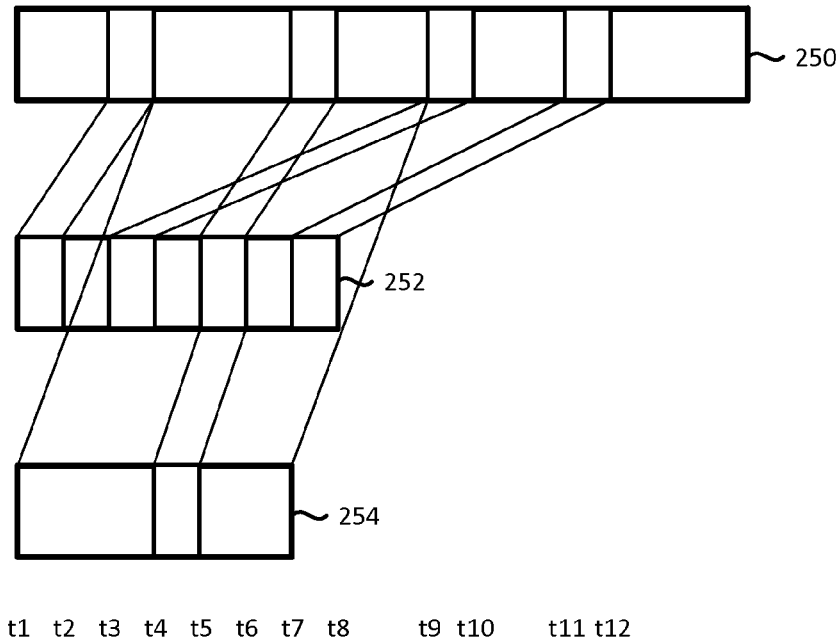
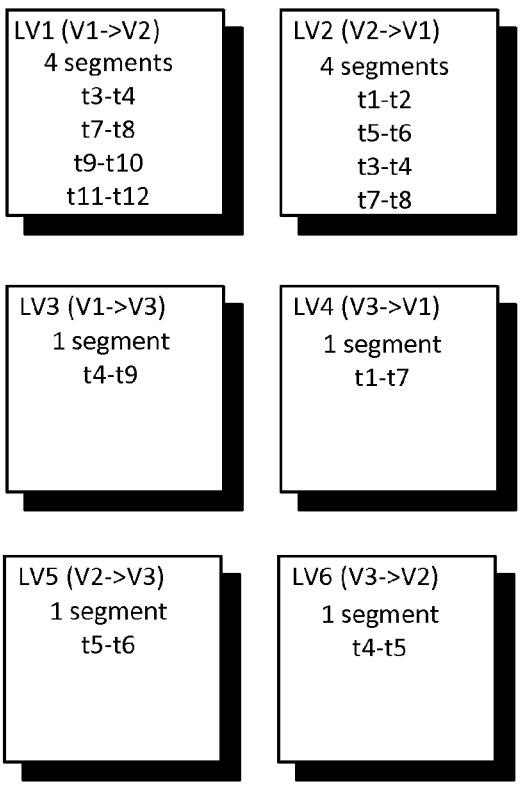
Figure 5

| VIDEO NODE | |
|---|---|
| Attributes | |
| video_id | – long |
| site_id | – long |
| codec | – string |
| image_width | – short |
| image_height | – short |
| video_duration | – float, in msecs |
| safe_search | – Boolean |
| tv_displayable | – Boolean |
| broadcast_tv | – Boolean |

*Figure 6*

| VISUAL LINK |
|---|
| Attributes |
| full_duplicate – Boolean |
| span_ratio – float, ratio {0-1.0} |
| span_duration – float, ms |
| #_of_segments – int |
| segment_start – float[], array, ms |
| segment_end – float[], array, ms |
| segment_span – float[], array of ratio {0-1.0} |

*Figure 7*

| TEXT LINK |
|---|
| Attributes |
| Title_match_score – float {0-1.0} |
| Series_name_match_score – float {0-1.0} |
| Cast_match_score |
| Director_match_score |
| Season_number_match |
| Episode_number_match |

*Figure 8*

For block on 8x8 grid, calculate 2 bits:
b1=(A+B)>(C+D)   b2=(A+C)>(B+D)
Count matching bits (hamming distance)

VIDEO IDENTIFICATION AND SEARCH

CLAIM OF PRIORITY

The present application claims priority from U.S. Provisional Patent Application No. 61/655,622, entitled "VIDEO IDENTIFICATION AND SEARCH," by Sharon et al., filed Jun. 5, 2012, incorporated by reference herein in its entirety.

BACKGROUND

The disclosed technology is related to video identification and search.

The identification and retrieval of content, particularly video which comprises multiple frames to produce a moving image, is a significant task. In recent years the amount of original video content being produced has increased while costs for storage have deceased. Accordingly, the amount of video content available has increased dramatically. Moreover, the available instances of a particular piece of video content has also increased. While attempts to produce metadata and other textual information to describe available content have provided some success in identifying and retrieving content, current solutions are largely ineffective.

Some search methods and systems are directed to identifying and retrieving content based on key words found in an associated file names, tags on associated webpages, text of hyperlinks pointing to the content, etc. Such search methods rely on Boolean operators indicative of the presence or absence of search terms. However, such search terms tend not to fully represent the content being searched, leading to poor performance when searching content such as video or audio.

SUMMARY

Systems and methods for identifying and searching video are disclosed. A video search and identification system may include a catalog representing relationships between video, data and/or objects to enable querying and search based on visual representations of video as well as data or other information associated with the video. In one example, the catalog includes video nodes, metadata nodes and card nodes, although additional or fewer node types may be used. Video nodes correspond to particular video sources or instances of video content. For example, a first video node may represent a first source of video content that is available from a first provider and a second video node may represent a second source of the same video content from a second provider. Metadata nodes correspond to particular data sources or instances of video information. For example, a first metadata node may represent a first video data source (from a first provider) for video content and a second metadata node may represent a second video data source (from a second provider) for the same video content. Card nodes correspond to objects such as people or physical things that may be depicted in video.

A visual-based video identification system is provided to identify content in video sources. An unidentified video source is accessed and visual fingerprints of one or more frames are generated as query signatures for matching against a base set of known signatures. The visual fingerprints include a bit-wise representation of a frame of video based on the brightness of cells of the frame in one example. Confidence measures are generated at the bit level to assist in query signature processing. Bit confidence measures can be used to adjust thresholds in determining whether query signatures have a sufficient probability to match a true base result, to terminate searches where the probability is low, and/or to determine a number of subsets or buckets for base set signatures against which the query signatures are matched.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a timeline illustrating the content of a set of video sources in one example and related visual links between video nodes.

FIG. 6 is a block diagram depicting a video node attribute schema in accordance with one embodiment.

FIG. 7 is a high level block diagram depicting a set of visual link attributes in accordance with one embodiment.

FIG. 8 is a high level block diagram depicting a text link attribute schema in accordance with one embodiment.

DETAILED DESCRIPTION

Embodiments in accordance with the disclosed technology include systems and methods for identifying and searching video-based content. In one embodiment, a video search and identification system includes a catalog representing relationships between video, data and/or objects to enable querying and search based on visual representations of video as well as data or other information associated with the video. In one example, the catalog includes video nodes, metadata nodes and card nodes, although additional or fewer node types may be used. Video nodes correspond to particular video sources or instances of video content. For example, a first video node may represent a first source of video content that is available from a first provider and a second video node may represent a second source of the same video content or a subsection of the same video content from a second provider. Metadata nodes correspond to particular data sources or instances of video information. For example, a first metadata node may represent a first video data source (from a first provider) for video content and a second metadata node may represent a second video data source (from a second provider) for the same video content. Card nodes correspond to entities such as people, objects, or places that may be depicted in video.

In one embodiment, a visual search system is provided that enables the identification of content in a video source based on visual representations of the video source. A visual fingerprint of one or more frames from a query can be compared with a corpus or base set of visual fingerprints to identify any matching video sources. In one embodiment, the visual fingerprint includes a bit-wise representation of a frame of video based on the brightness of divisions of the frame. In a further embodiment, the visual fingerprint includes a confidence level. Various confidence measurements can be used to select candidate video frames for querying against the corpus as well as portions of the candidate video frames to be compared to the corpus.

Figure 1:
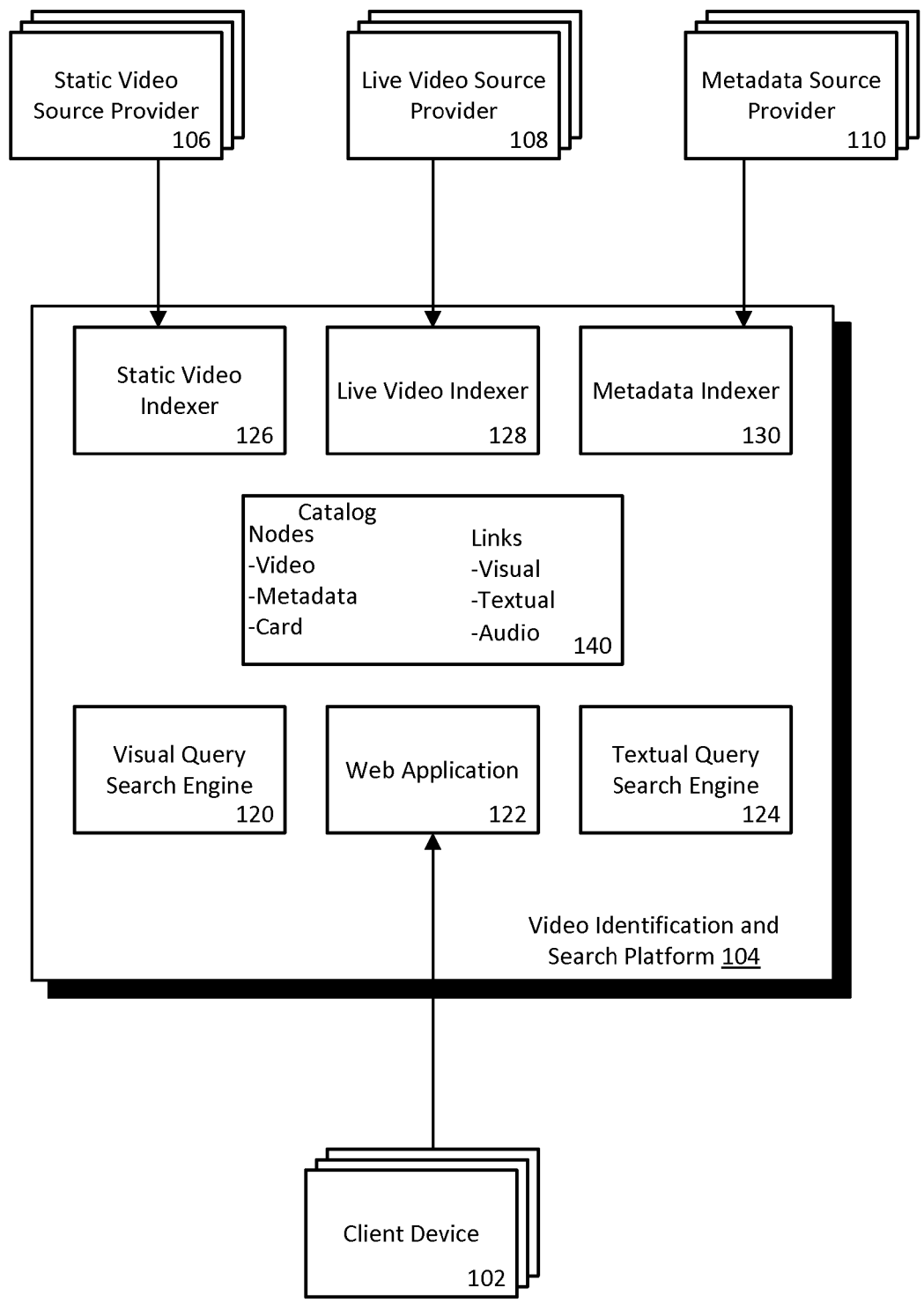
FIG. 1 is a high level block diagram depicting a video identification and search system in which embodiments of the presently disclosed technology may be implemented.

FIG. 1 is a high level block diagram depicting a video identification and search system in which embodiments of the presently disclosed technology may be implemented. In FIG. 1, one or more client devices 102, video identification and search platform 104 ("platform"), and multiple static video source providers 106, live video source providers 108 and metadata source providers 110 are in communication over one or more networks. Any number of video source providers, clients devices and platforms may be included in various embodiments.

Client devices 102 may generally include any type of device such as a personal computer, workstation, mainframe, server, tablet, PDA, cell phone, or other processor-based computing device. The client devices may be mobile devices or non-mobile devices. Mobile devices include cellular telephones, palmtops, pocket computers, personal digital assistants, personal organizers, personal computers (PCs), and the like. Embodiments can be used with any number of computer systems, such as desktop computers, other hand-held devices, laptop or notebook computer systems, multiprocessor systems, micro-processor based or programmable consumer electronics, network PCs, mini computers, main frame computers and the like. Reference to client devices is made hereinafter by example but it will be understood to include reference to computing devices in general except where noted.

Static video source providers 106 include providers of video sources that are generally available for retrieval from the provider in response to a user request for the video source. For example, static video source providers 106 may provide video sources in digital formats for download to client devices in block form. Static video source providers 106 may also utilize network based transmission to stream video sources to client devices for temporary storage and use. Live video source providers 108 include those whose video sources are provided on a per-use or one-time basis to client devices, such as by wireless or wired broadcast using analog or digital transmission. Metadata source providers 110 provide metadata sources, that include video information, such as might correspond to a particular piece of video content (e.g., television episode, movie, music video, television episode season, etc.). Generally, metadata sources include information about video content rather than information relating to a particular video content source (instance). Organizations providing metadata sources are well known in the art. Organizations providing static video are well known in the art. Organizations providing live video sources are well known in the art.

Video identification and search platform ("platform") 104 includes visual query search engine 120 and text query search engine 124. Visual query search engine 120 identifies video and video information based on visual query information that utilizes an analysis of visual content in a video source. Text query search engine 124 receives textual-based queries from client devices 102 and provides video information or information indicating instances or sources of video matching the query. The text query search engine may determine a video identifier for a source matching the query and provide information for retrieving the source to the client device. For example, the text query search engine may return a uniform resource locator (URL) for one or more video sources in response to a text-based query. Web application 122 interfaces with the visual and textual query search engines to provide a web-based front end user interface or API in one example. In other embodiments, a web application may not be included such as where a standard API or other interface to the video identification and search platform 104 is provided.

Static video indexer 126 receives video sources from the static video source providers 106. Static video Indexer 126 generates visual information from each video source, including a visual fingerprint of one or more frames in the video. The indexer can also extract any available textual data from the video, for example, information relating to title, cast, production, format, encoding, etc. that may be included in the video source file. In one embodiment, the static video indexer also creates an audio fingerprint for one or more frames of the video source. Live video indexer 128 interfaces with the live video source providers 108 to receive live or non-static based videos. Like the static video indexer, the live video indexer can generate visual information from each live video source and extract any available textual information. Metadata indexer 130 receives metadata sources from the metadata source providers 110. Metadata indexer 130 stores each metadata source in catalog 140 and optionally performs analysis and processing to generate additional information.

Catalog 140 stores information received from indexers 126-130 to describe and maintain relationships between video sources and metadata sources. The relationships and source information facilitate video search and identification by visual query search engine 120 and textual query search engine 124. Catalog 140 includes nodes corresponding to video sources, nodes corresponding to metadata sources, and other nodes corresponding to other video related information as more fully explained hereinafter. Catalog 140 further includes links that define or describe relationships between the various nodes. Visual, textual and/or audio links may be provided between any of the node types to describe a relationship or relationships between the nodes. The video links represent visually detected relationships between pairs of nodes. For example, a first video source node may have a visual link to another video source node to represent a match between visual fingerprints of the two video sources. Textual links may be provided between two nodes to define a textual relationship between the two nodes, such as by comparing text associated with two nodes. Similar to video links, audio links represent a match between audio fingerprints in one example.

Although specific components and software modules are depicted, it will be apparent that numerous physical and software based configurations may be employed while remaining within the spirit of the present disclosure. Generally, software and program modules, managers and engines as described herein include routines, programs, components, data structures, and other types of structures that perform particular tasks or implement particular abstract data types. Hardware or combinations of hardware and software can be substituted for software modules as described herein.

Figure 2:
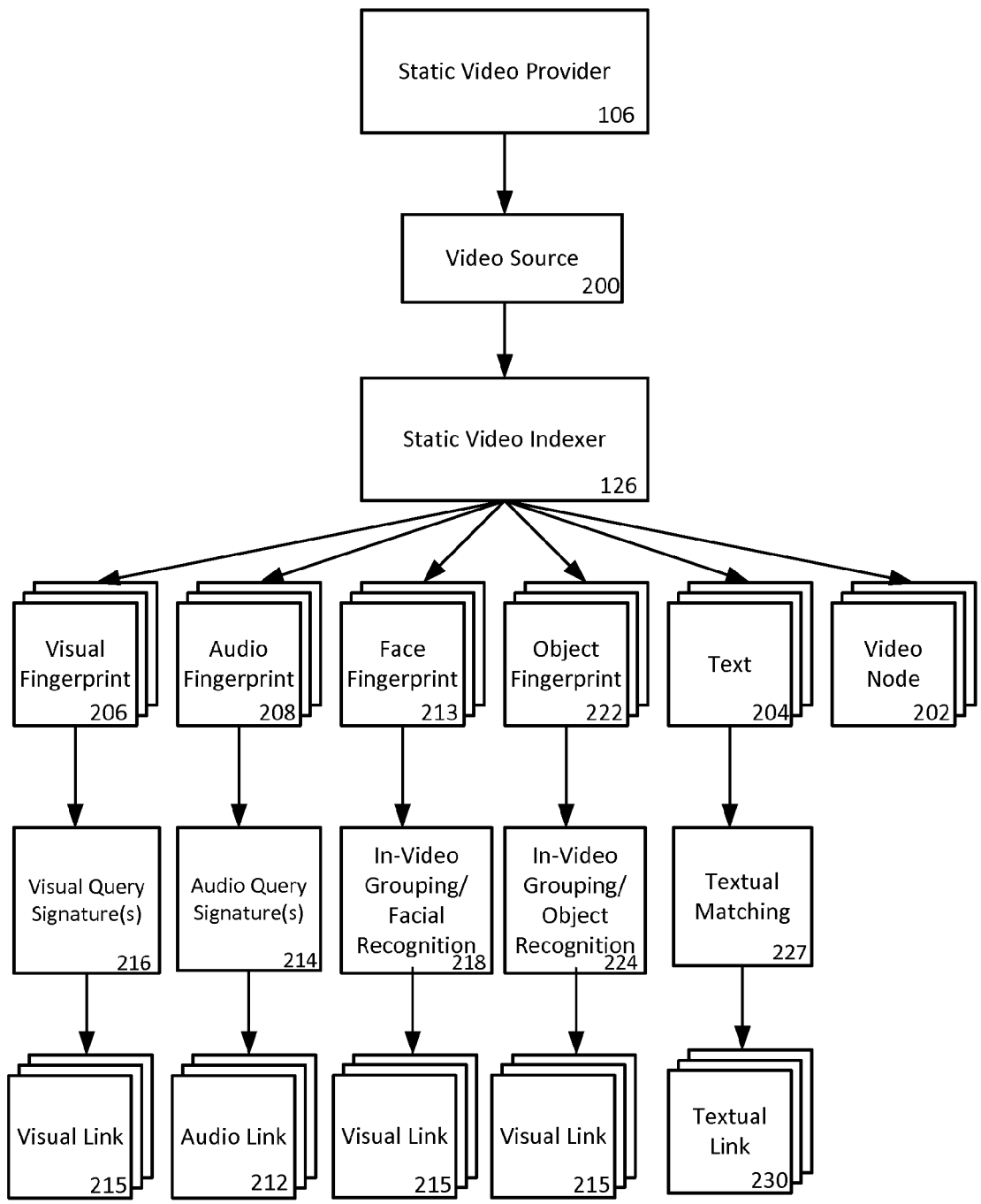
FIG. 2 is a high level block diagram depicting a static video indexer in one embodiment and related processing of a video source.

FIG. 2 is a high level block diagram depicting static video indexer 126 in one embodiment and related processing of a video source 200 from a static video provider 106. It will be appreciated that the functionality described with respect to static video indexer 126 in FIG. 2 is equally applicable to live video indexer 128 with respect to a live video source. Video source 200 may include, but is not limited to, a video file such as a file in accordance with a .avi, .mpg, .mpeg, .mpeg2, .mov, etc. standard. Numerous other type of video sources may be received. Live video sources such as analog or digital broadcast signals may be processed similarly, as portions of the video source are received in a live stream.

In FIG. 2, the static video indexer analyzes video source 200 for visual, textual, and/or audio related information. The indexer generates a video node 202 corresponding to the video source. The video node is a node in a graph-based database in one example, having a set of attributes to define information about the video source 200. Indexer 126 extracts any available text included in or with a source file to generate or extract text 204. Textual information can include, but is not limited to, file name, title, coding, cast/artist, production, date, etc. The indexer includes all or a portion of the text in video node 202 in one example. Static video Indexer 126 passes any textual information from video source 200 through textual matching 227 to identify any corresponding nodes within the catalog. Based on any textual matches, static video indexer 126 generates textual links 230 between video node 202 and any corresponding nodes. The video node includes a resource locator such as a uniform resource locator for the corresponding video source.

Static video indexer 126 extracts one or more frames of video from the video source to generate one or more visual fingerprints 206. Visual fingerprints 206 may include a fingerprint for every frame of video source 200 in one example or a subset of the frames in another example. Any type of visual fingerprint 206 may be generated. For example, visual fingerprints representing a brightness correlation between areas of a frame can be used in one example. The indexer generates one or more visual query signatures 216 based on the visual fingerprints 206 for comparison with a collection of pre-defined visual fingerprints with correlated video information. The signatures and/or visual fingerprints can be stored in a database or other storage. The indexer compares the query signatures with the collection of signatures to identify any matching video content in the collection of signatures. Based on matches, the indexer determines if any existing nodes in the catalog correspond to the matched signatures. Any determined visual relationships to existing nodes in the catalog are maintained using a link. If matching visual relationships are discovered, the indexer generates one or more visual links between video node 202 and the corresponding node in the catalog 140.

Static video Indexer 126 optionally generates an audio fingerprint 208 corresponding to all or a subset of the video frames. Any type of audio fingerprint may be generated. For example, audio fingerprints may be generated using averaged-spectrogram images. Audio query signatures are then generated and passed to a collection of known audio fingerprints. Based on identified audio relationships between the video source and existing nodes in the catalog, the indexer generates audio links 212 between video node 202 and the matching nodes.

Static video indexer 126 can also generate one or more facial fingerprints 213 based on identified faces within the video. The facial fingerprints are subjected to in-video grouping 218 to group together similar or like facial fingerprints. The group of facial fingerprints or a subset thereof are passed through a facial recognition process to identify a person corresponding to the facial fingerprints in the group. Indexer 126 can then generate one or more visual links 215 to define a relationship between the video node 202 and one or more nodes based on a visual relationship. For example, a visual link to a card corresponding to the identified face may be generated. In one example, if there is no identified face corresponding to the set, a new card node can be generated and linked to the video for the unidentified facial fingerprint. An automated or manual process can later be used to identify a person corresponding to the facial fingerprint for updating of the card node.

Like facial fingerprints 213, static video indexer 126 can generate an object fingerprint 222 for one or more objects identified within the video source 200. These objects can be any identifiable physical manifestation in the video such as, but not limited to, physical objects like products, buildings, toys, gear, clothes, etc. Object fingerprints 222 are subjected to in video grouping and object recognition 224. Based on any matching object recognition, visual links 215 can be created to define a relationship between video node 202 and a corresponding node (e.g., object card).

Similar to the static and live video indexers, the metadata indexer 130 stores each metadata source file or object from metadata providers 110 as individual metadata nodes in catalog 140 in one embodiment. For each metadata source, the indexer may perform a textual analysis and matching to determine relationships between the metadata source and any existing nodes in the catalog. For example, a metadata source for a television episode may be matched textually to a video node and a corresponding textual link can be generated to define that relationship.

Figure 3:
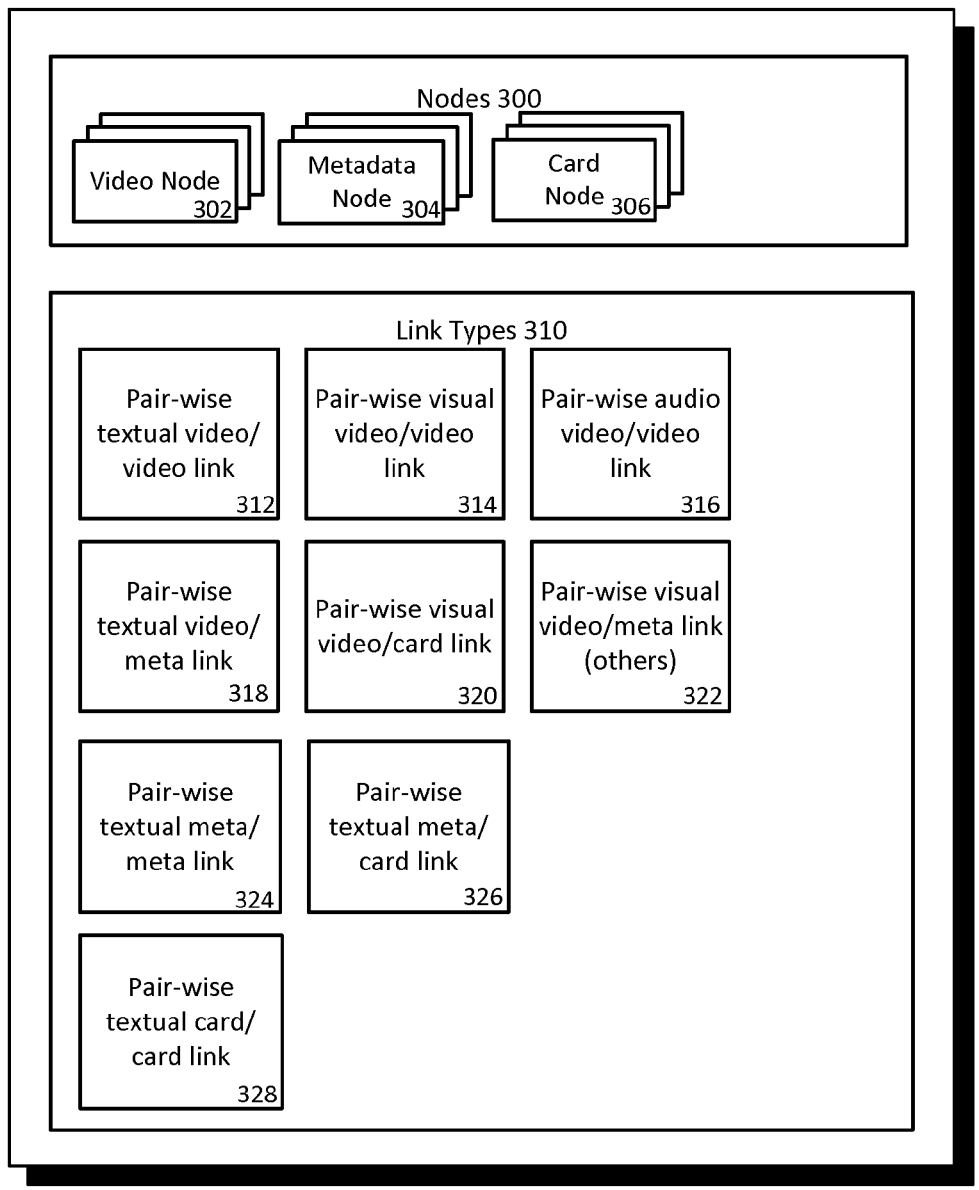
FIG. 3 is a high level block diagram of a graph based database in accordance with on embodiment.

FIG. 3 is a high level block diagram of a graph based database used to implement catalog 140 in one embodiment. Catalog 140 includes three generalized node types in this example: video nodes 302, metadata nodes 304 and card nodes 306. It is noted that in a graph database each node may be self-defined such that additional node types may be added through self-definition. This further enables a sub-classification of each node type. For example, a metadata node may generally, in one example, correspond to a television episode of which there were a plurality episodes in what may be referred to as a television series season. One metadata node may self-define itself as a season node with textual links to metadata nodes for each individual episode. Similarly, card nodes 306 may include sub-classifications whereby, for example, a first card type may be defined for a person based on facial recognition and a second card type self-defined as an object card. Facial cards, for example, may further include multiple cards for an individual person of interest. These cards may be useful in situations such as to track a person over time where facial features may have significant interpretive changes so as to represent the person through a period of time.

Catalog 140 includes a number of link types 310 to define relationships between any of the various nodes 300. Link types generally include textual links, audio links and visual links. Visual links may include visual links that indicate some overlap between video sources. This instance occurs where a first video source contains some portion of content from a second video source and the second video source contains some portion of content from the first video source. A second video link with a contained relationship may be provided to indicate that a first video source contains all of the content of a second video source. Likewise, the second video source may be provided with a visual link with a contained relationship to indicate that the second video source is contained within the first vide source. Finally, a full duplicate link relationship may be provided between two video nodes that correspond to the exact same content.

The links may be provided as a pair, with a first link having a first node as its origination node and a second node as its destination node. Likewise, the second link will have the second node as its origination node and the first node as its destination node. Links may be between the same node type or different node types. The specific link types 310 in FIG. 3 are shown by way of illustration and not limitation. It will be appreciated that additional or fewer link types may be included in various limitations to define relationships as appropriate to that implementation. Link 312 is a pairwise textual video/video link representing a textual match between two video nodes in the catalog. Pairwise visual video/video link 314 defines a relationship between two video nodes based on a visual match between the video represented by the two nodes. A pairwise audio video/video link 316 defines a relationship between two video nodes based on a matching audio fingerprint. A pairwise textual video/metadata link 318 defines a textual relationship between a video node and a metadata node. A pairwise visual video/card link 320 defines a relationship between a video node and a card node based on a visual match of the video corresponding to the video node. A pairwise visual video/metadata link 322 defines a visual match relationship between a video node and a metadata node. A pairwise textual metadata/metadata link 324 defines a textual match relationship between two metadata nodes. Pairwise textual metadata/card link 326 defines a textual match relationship between a metadata node and a card node. Pairwise textual card/card link 328 defines a textual match relationship between two card nodes.

Figure 4:
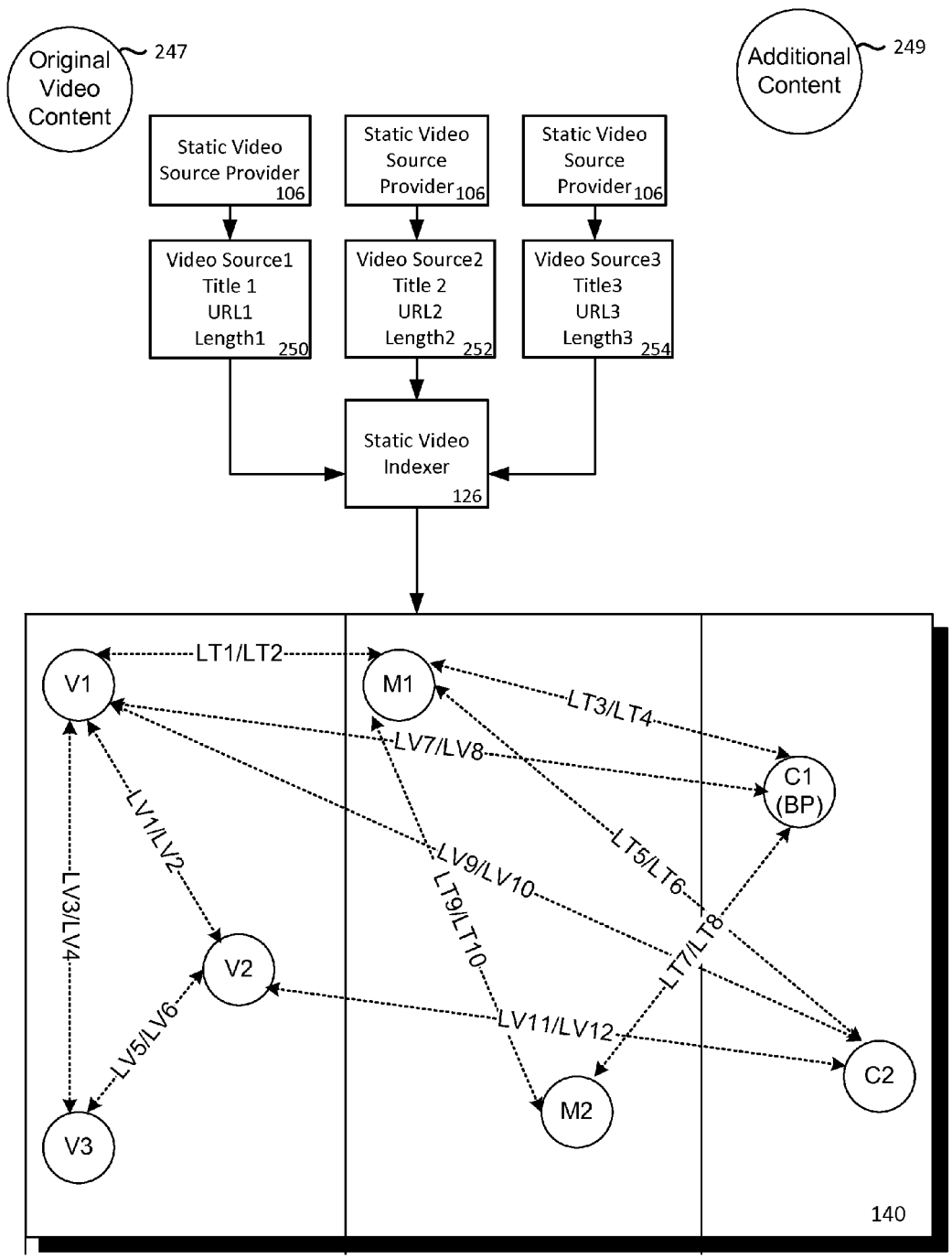
FIG. 4 is a high level block diagram depicting a specific example of a catalog in accordance with one embodiment.

FIG. 4 is a high level block diagram depicting a specific example of a catalog 140 in accordance with one embodiment. Original video content 247 and additional content 249 are provided by three static video source providers 106 in various combinations through different video sources. A first static video source provider 106 provides video source 250 which has a title Title1, a length Length1 and that is provided at a location indicated by URL1. A second static video source provider 106 provides video source 252 which has a title Title2, a length Length2 and that is provided at a location indicated by URL2. A third static video source provider 106 provides video source 254 which has a title Title3, a length Length3 and that is provided at a location indicated by URL3.

Static video indexer 126 receives video source 250 and generates video node V1. Video node V1 can be populated with any textual information determined from video source 250 as well as any information determined from a visual or audio parsing of the source. For example, node V1 may include the title Title1, the URL URL1, the length Length1 of the video, as well as coding information, source information, production information, cast information, etc. Similarly, static video indexer 126 generates video node V2 for the second video source 252 and video node V3 for the third video source 254.

FIG. 4 also depicts metadata nodes M1 and M2. Metadata node M1 corresponds to a first source of metadata. In this example, metadata node M1 corresponds to original video content 247. Metadata node M1 may be metadata for the television episode of original video content 247. In this manner metadata M1 does not correspond to any instance or source of original video content 247, but rather to the video content itself. A second metadata node M2 is generated from a metadata source that in this particular example, is assumed to correspond to a compilation video source that includes the original video content 247. For example, if original video content 247 is a television episode, metadata node M2 may correspond to a metadata source for a season of the television episodes or the entire series of television episodes.

Finally, the example in FIG. 4 depicts a first card node C1 and a second card node C2. In this specific example, card C1 is assumed to correspond to a person such as actor and card C2 corresponds to an object such as a bottle or specific car brand and model.

Static video indexer 126, as well as live video indexer 128 and metadata indexer 130 generate links between the nodes within catalog 140 to define relationships between videos and video information. In FIG. 4, an exemplary set of textual links is illustrated. For example, metadata indexer 130 may determine from the text of metadata node M1 that there is a match to text within an existing metadata node M2. Based on the matching textual relation, a textual link pair LT9/LT10 between metadata node M1 and metadata node M2 can be entered in catalog 140. Specifically, link LT9 specifies a textual link defining some portion of the relation and link LT10 specifies some other portion of the relation. For example, link LT9 may include information specifying the relation of information with M1 as the origination node to M2 as a destination node. Similarly, link LT10 may include information specifying the relation of information in M2 as the origination node to that of M1 as the destination node. For example, link LT9 may specify that metadata node M1 represents a subset of metadata node M2 and link LT10 may specify that metadata node M2 contains metadata node M1. Additional textual links are illustrated including LT1/LT2 between video node V1 and metadata node M1, LT3/LT4 between metadata node M1 and card node C1, LT5/LT6 between metadata node M1 and card node C2, and LT7/LT8 between metadata node M2 and card node C1.

In this example, static video indexer 126 detects visual matches between video sources 250, 252 and 254 based on overlapping visual content within the sources. In response, static video indexer 126 generates visual links LV1/LV2 between nodes V1 and V2, links LV3/LV4 between nodes V1 and V3 and visual links LV5/LV6 between nodes V3 and V2.

To further illustrate the nature of visual links, a specific example will be described with respect to FIG. 5 in conjunction with FIG. 4. FIG. 5 includes a timeline illustrating the content of each video source based on a same start time t1. In this example, it is assumed that video source 250 includes a full depiction of original video content 247. For example, original video content 247 may be a television episode and video source 250 may include the entire television episode. Video source 252 may be a trailer for the television episode containing four individual segments from the television episode and three segments from additional content 249. Source 254 contains a single segment from original video content 247.

Video source 250 includes a first video segment between time T3 and T4 that is the same as or that corresponds to a video segment in video source 252 from time T1 to time T2. Video source 250 includes a video segment from time T7 to T8 that corresponds to a video segment in video source 252 from time T5 to time T6. Video source 250 includes a video segment from time T9 to time T10 that corresponds to a video segment of video source 252 from time T3 to time T4. Video source 250 includes a fourth video segment from time T11 to time T12 that corresponds to a video segment in video source 252 from time T7 to time T8. Based on these matching video segments as determined by the indexer from the visual fingerprints of each video source, visual links LV1 and LV2 are generated as shown in FIGS. 4 and 5. In the detail of FIG. 5, visual link LV1 is depicted as having its origination at node V1 and its destination at node V2. Visual link LV1 includes a notation that there are four overlapping video segments between the link pairs. Following the number of overlapping video segments is an indication of the video segments within the origination video node V1. Thus, visual link LV1 includes a first time segment identifier noting time T3 to T4, a second time segment identifier noting time T7 to T8, a third time segment identifier segment noting time T9 to time T10, and a fourth time segment identifier noting time T11 to time T12. Static video indexer 126 generates a corresponding visual link LV2 with node V2 as its origination and node V1 as its destination. Visual link LV2 notes that there are four video segments that overlap. Visual link LV2 includes a first time segment identifier noting time T1 to time T2, a second time segment identifier noting time T5 to time T6, a third time segment identifier noting time T3 to time T4 and a fourth time segment identifier noting time T7 to time T8.

Static video indexer 126 generates visual link pair LV3/LV4 based on the matching fingerprints between video sources 250 and video source 252. As noted in the detail of FIG. 5, visual link LV3 has as its origination visual node V1 and as its destination video node V3. Visual link LV3 indicates one overlapping video segment and that the video segment occurs at time T4 to T9 in video source 250. Indexer 126 generates a corresponding visual link LV4 with video node V3 as the origination and video node V1 as the destination. One overlapping time segment is indicated between time T1 and time T7 of video source 254.

Based on matching visual fingerprints between video source 252 and video source 254, static video indexer 126 generates visual link pair LV5/LV6. As depicted in the detail of FIG. 5, visual link LV5 has as its origination video node V2 and its destination video node V3. Visual link LV5 indicates one overlapping video segment between time T5 and time T6 of video source 252. Visual link LV6 has as its origination video node V3 and its destination video node V2. Visual link LV6 indicates one overlapping video segment between time T4 and T5.

FIG. 4 also depicts visual link pairs between video nodes and card nodes. In this specific example, static video indexer 126 determines from facial recognition that the person associated with card node C1 appears in video source 250 only. Accordingly, a visual link pair LV7/LV8 is generated between node V1 and node C2. The links may specify time segments in video source 250 in which the person of node C2 appears. Indexer also determines from object recognition that video sources 250 and 252 contain a depiction of the object associated with card node C2. Accordingly, link pair LV9/LV10 is generated between node V1 and node C2 and link pair LV11/LV12 is generated between node V2 and node C2.

Consider an example of the use of nodes and links in FIG. 4 for query processing. After mapping a query to card C1. Platform 104 may use textual links LT4 and LT8 to determine metadata nodes M1 and M2 relate to card C1. From the metadata nodes, the platform may determine whether query parameters are met. For example, whether the corresponding video content was from a specified time period, etc. The platform may then utilize one or multiple cascaded links of visual, textual, or audio types from a matching metadata node to locate video nodes that contain location information for a matching video source. Consider a query that is received and specifies all videos in which a certain actor appears. Platform 104 may determine from a visual link to an associated card that the actor appears in a video corresponding to a particular video node.

FIG. 6 is a block diagram depicting a video node attribute schema in accordance with one embodiment. It is noted that the exact schema is provided by way of example, not limitation. Other embodiments may include additional or fewer attributes than those depicted. In this example, the attribute includes a video ID attribute represented as a long data type. The video ID is an individual identifier for the corresponding video source or instance. The video ID enables tracking of the video source. Although not depicted, a separate content id may be used to textually identify an original video content contained in a video source. More than one content id can be used. The site ID attribute is a long data type and provides an identification of the site or provider of the video source. The codec attribute is a string data type and identifies the coding used for the video source. The image width attribute is a short data type and indicates the width of the video depiction and the image height attribute, also a short data type, depicts the height of the video to define the video's aspect ratio and size. The video duration attribute is a float data type indicating the overall length of the video in milliseconds. The safe search attribute is a Boolean data type indicating whether the video is suitable for safe searching. Various values may be included to depict various levels of filtering. The TV displayable attribute indicates whether the video source is displayed on a TV as opposed to a computer base monitor based on content, license or other agreements. The broadcast TV attribute is a Boolean data type indicating if the source video was from a broadcast TV provider.

FIG. 7 is a high level block diagram depicting a set of visual link attributes in accordance with one embodiment. As earlier described, a visual link may be generated between two video nodes or between a video node and a card node. Visual links are provided in visual link pairs. For example between two video nodes a visual link will be generated that points from an originating video node to a destination video node. In FIG. 6, a full duplicate attribute provided as a Boolean data type indicates whether the link is between fully duplicated video sources. For example a full duplicate may be generated between two video sources that each depict a same television episode but are provided by different video providers. The span ratio attribute is a float data type expressed as a ratio value between zero and one that indicates a ratio of overlapping spans in one example. The span duration attribute is a float data type provided in milliseconds. The number of segments attributes is an integer data type indicating the number of segments that overlap between the two nodes. The segment start attribute is a float data type provided in an array format of milliseconds. The segment end attribute is also a float data type for an array provided in milliseconds and the segment span is a float data type provided in an array using a ratio between zero and one. The array format is provided so that the multiple segments can be indicated with their start and end times. The segment span value is the length of the segment that overlaps. As earlier described each visual link is provided in a pair. Using two visual links, platform may determine the exact overlapping segments of different video sources as illustrated in FIGS. 4 and 5.

FIG. 8 is a high level block diagram depicting a text link attribute schema in accordance with one embodiment. Like visual links, text links are provided in link pairs having an originating node and a destination node with an individual text link including information corresponding to the originating node. In a specific example of FIG. 7 the attributes include a title match score which is floating data type provided between zero and 1.0 to indicate a relative matching value between the titles of two nodes. The series name match score is also a floating data type between zero and one will indicate a value representing a match number to indicate a similarity between the two series names. Like similar attributes are provided for the cast match score, director match score, season number match and episode number match.

Each node and link may also contain one or more confidence measures relating to the status of the information in a node or the relationship between nodes. For example, consider a metadata node corresponding to a metadata source from an unknown metadata provider. For example, platform 104 may include various web or internet crawlers, scrapers to extract video information and metadata. Some sources may be unknown or otherwise untrusted. A measure of confidence in a node can correspondingly be generated and maintained in the node. The measure of confidence can be used in responding to queries. Similarly, a measure of confidence of a visual link may be generated between two nodes. For example, if the match between a first video source and second video source was not very strong, a measure of the level of matching can be indicated in the links between the two corresponding video nodes.

Figures 9, 10:
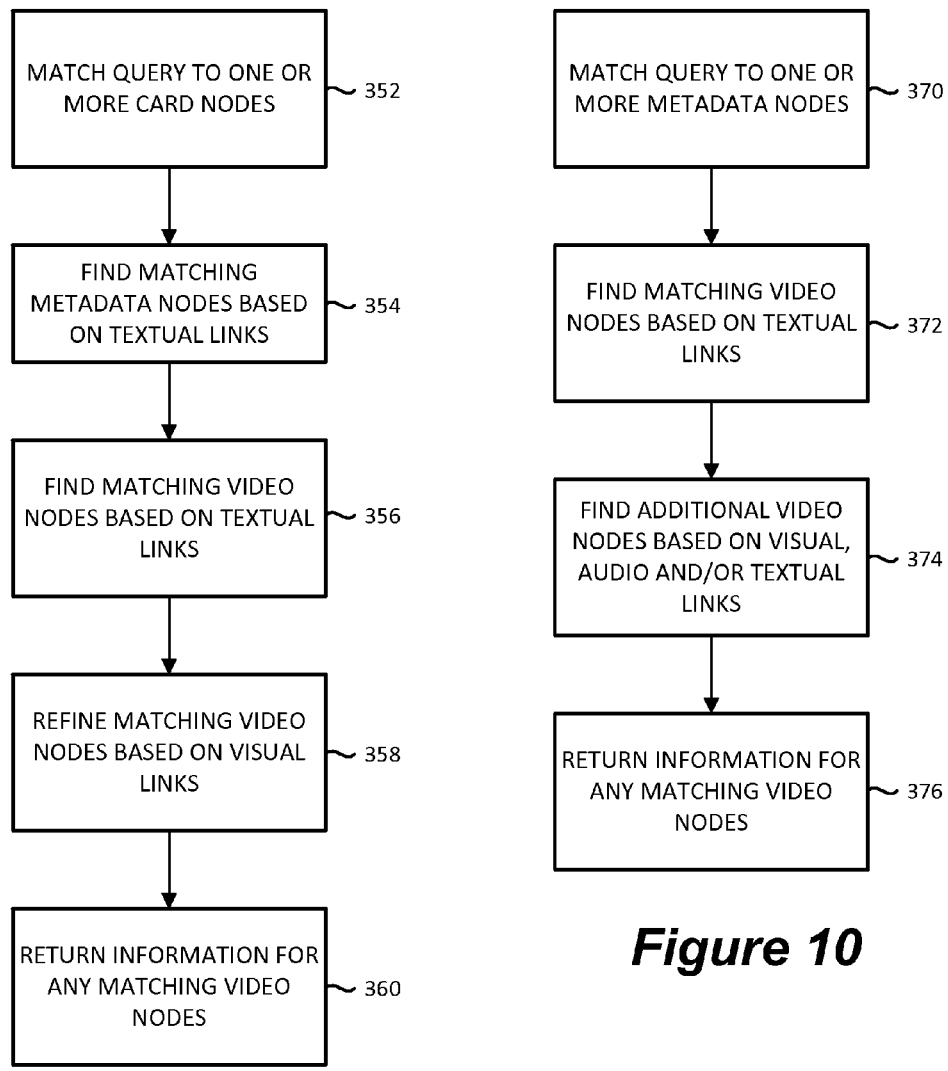
FIG. 9 is a flowchart describing a method in accordance with one embodiment for returning video information in accordance with a textual based query.
FIG. 10 is a flowchart describing a method in accordance with one embodiment for returning video information in accordance with a textual based query.

FIG. 9 is a flowchart describing a method in accordance with one embodiment for returning video information in accordance with a textual based query. For example, the method of FIG. 9 may be performed by textual query search engine 124 to response to a text-based query received by web application 122 from a client device 102. The system can utilize text query search engine processing exclusively or use dedicated webapp machines to parse the query and manage connections. At step 352, the search engine matches a query to one or more card nodes in the catalog. In one example, the text query search engine may parse a text query and apply one or more search algorithms to identify one or more matching card nodes. In another example, the video identification and search platform may receive the results from another search engine with an identification of a card node and perform the subsequent processing as described. At step 354, the search engine finds any matching metadata nodes based on textual links having an origination node at the identified card node from step 352. In one example, the textual links provide a mapping from the card node to the metadata node and the search engine determines from the metadata node information where the query is satisfied. In another example, the textual links between nodes provide an intermediate or full processing to determine whether the destination metadata node satisfies the query without retrieving metadata node information. At step 356, matching video nodes are found based on textual links. In one example, the matching video nodes are identified by traversing textual links between the metadata nodes from step 354 and then by traversing an additional textual link from the matched metadata node to a video node. As with matching metadata nodes, the video nodes may be identified using video node information, textual link information between nodes, or a combination of the two. At step 358, the matching video nodes are refined or reduced based on visual links. In one example, step 358 includes examining visual links between the matched card nodes from step 352 and the matched video nodes from step 356 using any video links between corresponding nodes. For example, a visual link between a video node and a card node may indicate a segment of a video source in which a person corresponding to the card node appears. The platform can refine the matching video nodes, for example, by returning individual segments of video or locators for the same based on visual identification information. For example, a visual link between a card node and video node can specify the particular segments of a video source in which an object appears. In this manner the platform can return particularized results including particular segments matching a search query rather than entire video sources. At step 360, the search engine returns information for any matching video nodes. In one example, step 360 includes returning a resource locator for the video source corresponding to the matched video nodes. For example, a URL stored in the video node may be passed as a result to the query. More than one video identification may be returned. In one example, the video ID attribute from the video node is returned.

FIG. 10 is a flowchart describing another method in accordance with one embodiment for processing a textual based query, illustrating that queries may enter catalog 140 through metadata nodes as well as card nodes. At step 370 the text query search engine 124 matches the text query to one or more metadata nodes. At step 372, the search engine identifies matching video nodes from textual links originating at the metadata nodes matched in step 370. At step 374, the search engine identifies additional video nodes based on visual, audio and/or textual links having as their origination point a video node from step 372. For example, the search engine may follow a visual link between a first video node and a second video node to determine that a video node matched in step 372 is duplicated at another video node or is fully contained within a video at another video node based on the visual link. A text link may be traversed between video nodes as can audio links to provide the same information. Additionally, textual links may be traversed form a video node to metadata and/or card nodes, and back to matching video nodes to identify additional video nodes.

It is noted that FIGS. 9 and 10 and the methods described therein are particular use case example of query processing by the identification and search platform. In further embodiments, queries may be processed in additional ways utilizing additional or combinations of the steps described herein. For example, one example may not include refining matching video nodes in FIG. 9.

Figure 11:
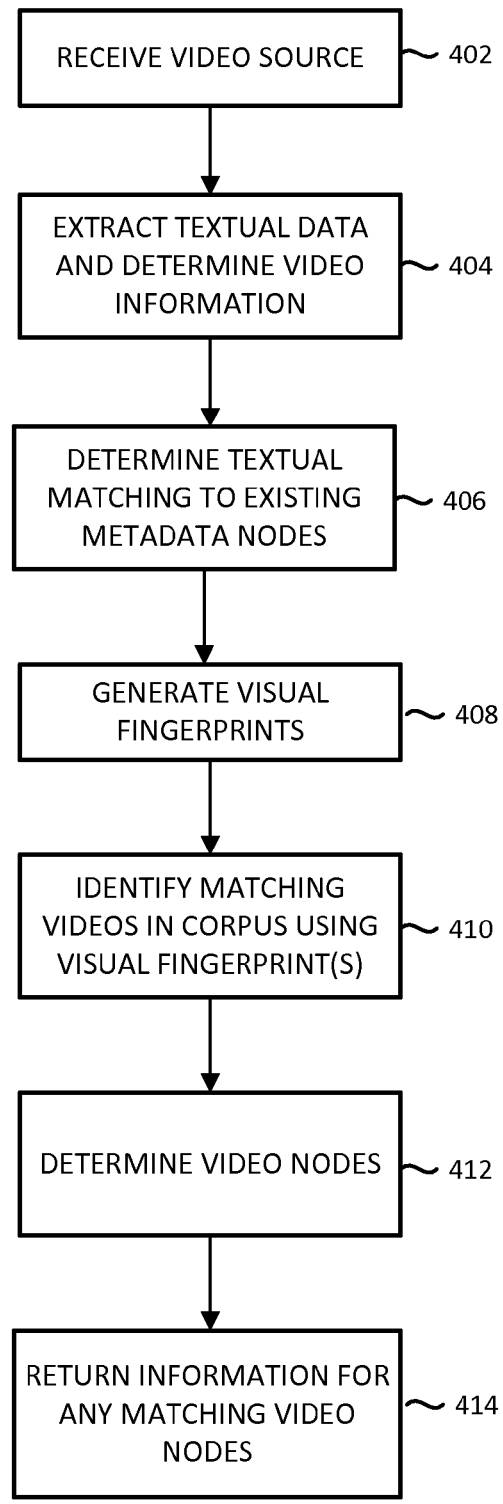
FIG. 11 is a flowchart describing a method in accordance with one embodiment for processing a visual based query.

FIG. 11 is a flowchart describing a method in accordance with one embodiment for processing a visual based query at video identification and search platform 104. The method of FIG. 11 describes processing to identify video based information such as metadata cards, video nodes and information contained therein based on visual information such as can be received from a video source. At step 402, the platform receives video. Step 402 includes receiving a video source. In one example, the video source is a video file. In another example, the video source is a broadcast data stream. In one example, the data stream is an analog broadcast signal. In another example, the broadcast stream is a digital stream such as can be provided over a processor based network. At step 404 the video query search engine 120 extracts any textual information from the video source. This may include a file name, a title, length, coding, or other information included as part of a video source file.

At step 406 visual query search engine 120 determines any textual matching to existing metadata nodes in the catalog. Step 408 can include a textual comparison from extracted data at step 404 or other video information and comparing that information to the data in existing metadata nodes.

At step 408, visual fingerprints are generated from the video source. In one example, step 408 includes generating a visual fingerprint for each frame of the video source. In other examples, less than all of the frames may have a corresponding visual fingerprint. At step 410, the query search engine identifies any matching videos in a corpus of videos using the visual fingerprints from step 408. In one example, step 410 includes identifying videos in the corpus having a matching fingerprint to that of the source video. The identification at step 410 can include a simple identification of a matching video in one example. In another example, an exact correspondence can be determined and reported in response to the query. For example, step 410 can include a fingerprint analysis of each frame to determine a level of matching between the source video and the corpus videos. For example, an identification at step 410 may be of a segment of video within the video source from step 402 rather than an identification of the entire video. Additionally, a new video that has never existed but that is made up of portions of already existing video could be identified at step 410 by identifying matching segments from the source video to each of the matching segments in the corpus.

At step 412, matching video nodes are determined in the catalog 140. A content id can be determined for the matching video in the corpus to determine any matching video nodes in the catalog in one embodiment. At step 414, the platform returns information for any matching video nodes.

In one embodiment, the system can extract signatures from video frames, to be directly compared in order to match video frames between a large corpus of "ground-truth" videos and frames represented by the catalog and signatures for the associated video content. This corpus or "ground-truth videos" may be referred to as a base set of videos and frames or their signatures. The system can also index signatures for the purpose of searching through swiftly for finding any potentially or partially matching particular signature (or a small set of signatures).

In one specific example, the system can divide each video frame (image) into 64 (8×8) equal size rectangular ordered cells. In each cell the system can generate two ordered bits. For example, a first bit=1 if the right half of the cell is brighter than the left half, and the first bit=0 if it's darker. A second bit=1 if the upper half of the cell is brighter than the lower half, and the second bit=0 if it's darker. Thus, the system generates an ordered list of 128 bits per frame, coming from the 64 ordered cells, creating an ordered bit representation of brightness.

As a note, similar and other related signatures can be employed, which may have different levels of robustness with respect to low-quality videos, low-quality cellular-phone camera recordings, bad lighting conditions, etc. One simple example includes dividing the active screen to larger 6×6=36 equal size rectangular cells, then producing a larger signature of, for example, say 196 bits (rather than the 128 described above) by way of comparing many different pairs of cells with respect to which is brighter than the other and producing the respective bits (similar to what is explained above for the 128-bit signature).

Random 5 or 10-bit sets and 16 collections of 5-bit sets can be used in one example. Experiments show that matching of the 128 bits between a ground-truth frame and a query same-frame from a mobile capture, for example (saturated intensities, etc.), is identical in about 80% random bits, whereas a random match would merely be 50% identical bits. In a 10-bit set example, there are $2^{10}=32$ values that each randomly selected set of 10 bits may undertake—so that each such 10-bit set divides the frame corpus into 1024 buckets, assuming that base set frames are uniformly distributed into all buckets. The corpus refers to the set of frames or frame signatures to which frames or frame signatures of the unidentified video source are compared. The corpus may be a set of identified frames or signatures which can be referred to as a base frame set. The buckets may be referred to as subsets of the base frame set.

The probability of finding the correct frame in a 10-bit matched bucket is $0.8^{10}=0.107$. If this experiment is repeated 14 times, i.e. selecting random 10-bit keys and checking all the frames in the corresponding buckets 14 times, the probability of missing in all 14 trials is $(1-0.107)^{14}=0.205$. With this setup, a comparison of all 128 bits of the selected query frame against 14/1024=1.37% of all frames in the corpus is needed to attain 79.5% probability of finding the correct matching frame. Since a query contains may contain 8 seconds of video or more, which typically contains 15 to 30 frames per second, the 10 most different frames in the query can be selected and the same algorithm applied to reduce the number of comparisons. The probability of missing all 10 frames is $(1-0.795)^{10}=1.31e-7$.

It is possible to further improve the efficiency of the search system by probing multiple buckets or subsets from the same 10-bit key. For example, it may be established that at least 9 out of the 10 bits need to match between the query and the corpus or base set signatures. In this case, the probability of finding the correct match is $(0.8^{10}+10*0.5*0.8^9)=0.778$ while comparing the query against roughly 11/1024=1.07% of all frames in the base set. Using the 10 most different frames in the query, the probability of missing all 10 frames is $(1-0.778)^{10}=2.91e-7$. Since a new hash table is used for each additional 10-bit key, not requiring many 10-bit keys provides major savings in storage space. In addition, a check of the query signature is performed against only 1.07% of the base set instead of 1.37% in the less efficient technique, which results in speed improvement for approximately the same success rate.

In one example, the probability of false positives can be calculated for a single frame using central limit theorem. This theorem establishes that both true positives and false positives will have normal (Gaussian) distributions. The expected value of the matched bits for a false positive is $0.5*128=64$ and the standard deviation is $sqrt(128*0.5*0.5)=5.66$. The expected value of the matched bits for a true positive is $0.8*128=102.4$ and their standard deviation is $sqrt(128*0.8*0.2)=4.53$. If a threshold of 92 bits is established, i.e. $(102.4-92.0)/4.53=2.3$ standard deviations below true positive mean, 98.9% of the true positives will be detected above this threshold. This threshold will be $(92-64)/5.66=4.95$ standard deviations above the expected value of the false positives, yielding a false positive probability of $3.7e-7$. Note that this false positive probability is calculated for a single frame. The system may achieve lower false positive probabilities by using a multiplicity of frames and their relations in the time-scale in a final validation stage. Accordingly, a variable threshold can be used.

Figure 14:
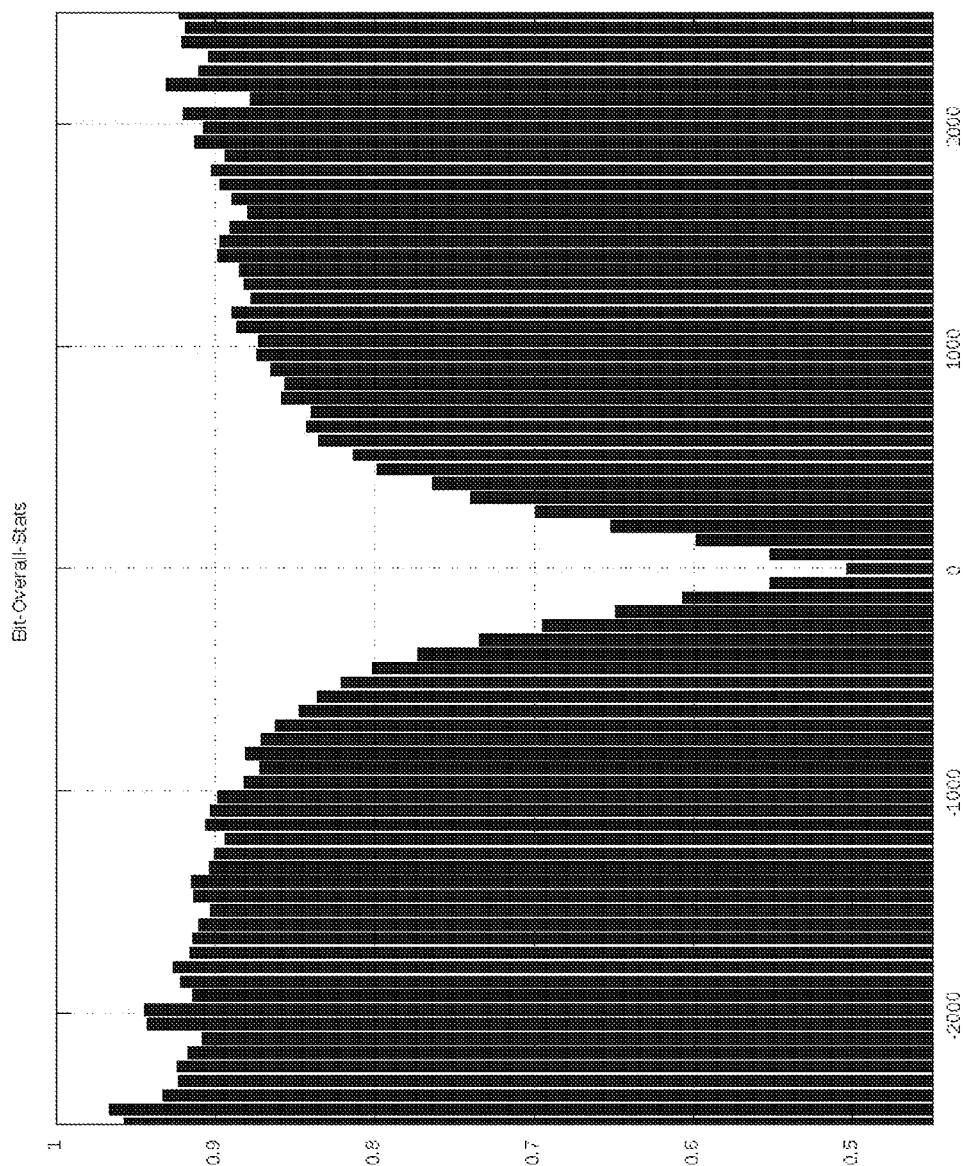
FIG. 14 is a graph depicting the results of an experiment illustrating the correlation between a bit difference measurement and the probability of that query bit correctly matching.

It is possible to improve the search system further if individual bit matching probabilities are available on a per query basis. In the previous examples, it was assumed that all bits have equal matching probability of 0.8. The conditional matching probability of each bit can be estimated based on how each bit was generated. Such a plot is shown in FIG. 14, where the vertical axis is the intensity difference that generated the bit and horizontal axis is the probability of the query bit matching the base set bit. It is possible to compute and store this conditional probability based on the query, or the ground truth, or both. The signature type and generation drives the conditions for which the matching probability of bits dependent on. Once individual bit matching probabilities are available, the expected value of the matched number of bits for the true positive can be calculated as as Sum p_i, where p_i is the probability of matching the bit at position "i". In one embodiment, this value can be used to raise a variable threshold to decrease the false positive rate for queries with very strong matching probability. In another embodiment, this value can be compared against a given threshold to calculate the probability of finding the true positive as demonstrated above and search can be terminated immediately if the success probability of the true positive is low. In another embodiment, the individual bit probabilities can be used to select the bit positions to be probed in the 10-bit keys. It is intuitive that if a bit has a low matching probability, it is more likely that the base set bit may be flipped. Consequently, checking the subset or bucket that corresponds to the flipped version of the bit will increase the chances of success more than checking other buckets. In one embodiment, the cumulative success probability can be used to determine the number of buckets that need to probed and select the sequence of buckets that minimizes the number of buckets.

There will be a pre-calculated probability of false positive matches for any particular single frame (see the analysis for false positive above). Per each query frame the system can find a match to the correct corresponding ground-truth or base set frame with a designed probability, as well as false-positive matches to a small collection of other different frames. The larger the corpus of signatures being matched to is (being searched over) the larger is the chance to match any given query signature to false positive frames as well.

All numbers involved are completely free design parameters (64 regions, 128 bits, 10 bit sets, and 14 repetitions, etc.) and are subject to the overall and different size of the frame corpus and its various chunks, the number of frames in the query, and expected query quality; and to be tuned accordingly. Similar indexing methods arranging the entire corpus of bit signatures by the values of various particular pre-determined sub-sets of bits can also be employed.

Figure 12:
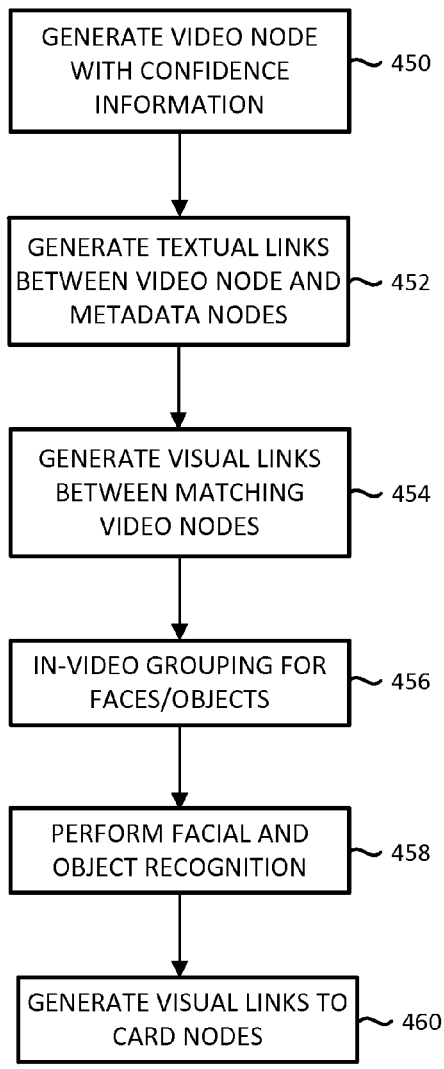
FIG. 12 is a flowchart describing processing by a visual search engine to generate catalog information from a query video in one embodiment.

FIG. 12 is a flowchart describing further processing by the visual search engine to generate catalog information from a query video. At step 450, the query search engine generates a video node for the video source received at step 402. At step 452 the query search engine generates textual links between the video node and any matching metadata nodes. At step 454 visual links between matching video nodes are generated in accordance with the matching at step 410 and 412. At step 456 in video grouping for faces or objects is performed. Step 456 includes using facial or object fingerprints to identify a common set of faces or objects in the video. Step 458 includes facial and object recognition to associate each set of step 456 with a particular person or object. At step 460 visual links to card nodes are generated based on the facial and object recognition of step 458.

Figure 13:
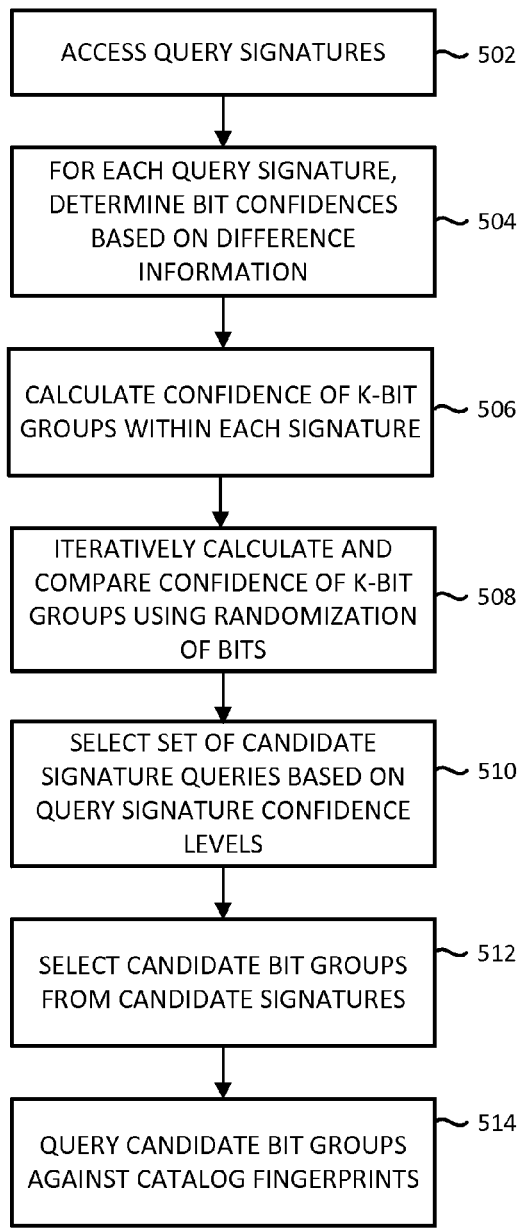
FIG. 13 is a flowchart describing a method in accordance with one embodiment for identifying or matching a query video with a source video.

FIG. 13 is a flowchart describing a method in accordance with one embodiment for identifying or matching a query video with a source video using catalog 140 to identify video nodes and/or metadata nodes. In one example, the method of FIG. 13 can be performed at step 410 of FIG. 11 or as part of generating video nodes and visual links as described in FIG. 2.

At step 502 the query search engine 120 accesses the visual fingerprints for the query video source. The video query search engine accesses the visual fingerprints generated at step 408 of FIG. 10 in one example. In one example, the visual fingerprints are generated for each frame of the video source. In one example, each visual fingerprint is a video frame signature. The system can divide each video frame into equal size rectangular ordered cells. In each cell the system can generate two ordered bits. For example, a first bit equals one if the right half of the cell is brighter than the left half, and zero is it is darker. A second bit equals one if the upper half of the cell is brighter than the lower half and zero if it is darker. Thus, the system has an ordered list of bits per frame coming from its ordered cells to generate a visual fingerprint. In one example, a block of a video frame image is divided into 64 eight by eight rectangular ordered cells to generate 128 bits per frame coming from 64 ordered cells.

At step 504 the system calculates a confidence for each bit in each query signature based on difference information between the bits as further described below. At step 506 a confidence measure is calculated for a k-bit group or groups within each signature. For example, a predetermined bit group from each frame can be selected. This may correspond to a predetermined area of interest such as the middle of a video screen or other area. The confidence measure at step 506 can be based on a total or a combination of the confidence measures of each bit within the bit group. At step 508 the search engine calculates confidence measure for each k-bit group using randomization of weaker and/or stronger bits. At step 510 a set of candidate signature queries are selected based on the query confidence levels from step 508. For example, calculating a confidence of each k bit group of each signature utilizing the randomization in step 510 can be used to select a small group of fingerprints from the fingerprints of the totality of frames to form the candidate group at step 512. At step 514 the candidate bit groups are queried against the catalog fingerprints.

Consider the following example, illustrating further detail of FIG. 13 in one example. An example is provided with N hash tables, M query signatures, and K-bit hash-keys. An objective is to select the minimum number of hash keys that would accumulate the highest level of confidence. The following pseudo-code is illustrative.

```
selected_keys = empty
pri_queue = empty # Priority queue returns the highest value item
    without sorting all items.
ForEach hash_table h=1:N
    ForEach query_signature m=1:M
        key = select K-bits from m as defined by h
        calculate confidence of key
        insert val = (confidence, h, key, m) into pri_queue
total_confidence = 0
while (total_confidence < confidence_threshold)
    get the highest confidence item high_val from pri_queue
    total_confidence = total_confidence + high_val.confidence
    insert high_val into selected_keys
    ForEach bit in high_val.key
        if high_val.key[bit] is the same as high_val.m[bit] then
            new_cand = high_val
            flip new_cand.key[bit]
            calculate new_cand.confidence
                if new_cand is not in pri_queue then
                    insert new_cand into pri_queue
Query the selected keys . . .
```

Further, consider that in terms of confidence two offline measurements can be determined and stored.

1. The probability of a pair of bits being correlated. One can calculate covariance matrix or bit bigrams to measure the covariance. This helps measure how much information is captured with bit encoding. For example, if two bits are always flipping together, this may mean that only one effective bit worth of information has been encoded.

2. The conditional probability of a query bit matching its indexed bit given its difference. In one experiment, a training sample set of ~500 queries were compared against the corresponding video signatures in the base set. The difference space was divided into a fixed number of bins. Then for each bit in each query, bit matching statistics based on the difference bin were accumulated. Finally, regression was applied to estimate the matching probability function is closed form.

At query processing time, a random variable called X can be defined where $$X = \text{sum\_(all bits } i) x\_i$$

$$x\_i = (p\_i - q\_i) * b\_i$$

p_i: the output of matching probability function for bit i
b_i: 1 if query bit matched the base set bit, 0 otherwise.
q_i: the probability of randomly matching query bit i to indexed bit (=0.5)

This random variable may be used as follows.

1. X provides a measure of how much information content can be encoded in a given query bit sequence. If all p_i and q_i values are close, X will be very small, which indicates that there may not be enough information to validate a query. Hence the query may be skipped.

2. The expected value and standard deviation of X using the measurements above is calculated. This provides the threshold to "reject null hypothesis". In one case, null hypothesis is that the query matched a random video, i.e. the match is a false positive. If null hypothesis probabilistically is rejected, i.e. the chances of this pair matching at random is slim to none, it may be decided that the pair did not match at random. This may indicate it is the correct match.

FIG. 14 depicts the results of an experiment similar to that described above where the horizontal axis represents the bit difference and the vertical axis is the probability of that query bit matching its correct pair. Using the data of FIG. 14, a bit confidence measure for each bit in a fingerprint can be calculated an integrated into identification and search as described.

Figure 15:
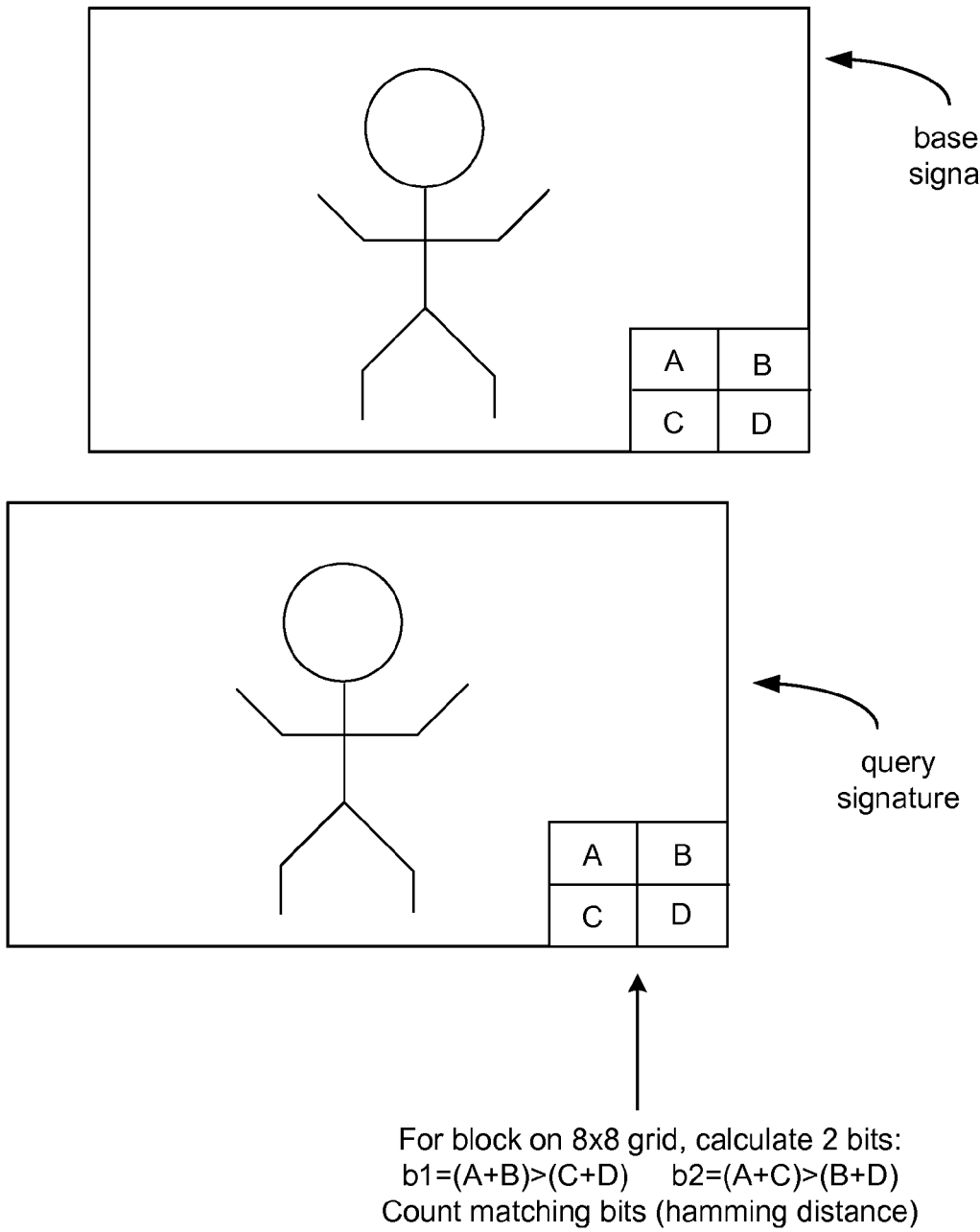
FIG. 15 is a block diagram depicting a similarity based image matching technique in accordance with one example.

FIG. 15 is a block diagram depicting a similarity based image matching technique in accordance with one example. The visual fingerprint comparison between a base set signature and query signature is illustrated. In this example, an 8×8 grid is created and for a block on the grid, two bits are calculated b1 and b2. B1 represents a comparison of the brightness of the upper and lower halves of the signature and b2 represents a comparison of the brightness of the left and right halves of the signature. The matching bits are counted (hamming distance). In one embodiment, the weighted hamming distance is calculated, where weight is proportional to visible differences.

One embodiment includes preparing query-frames for an audio query that includes identifying the correct temporal alignment and selecting representative frames. The system can divide the video's audio stream into consecutive temporal segments such as segments made of 4 seconds each (e.g., see section D below). Each of which can then be translated into an averaged spectrogram image that the system can associate with its particular video frame location (e.g., the video frame located at its beginning). The system can then extract visual signatures from each such averaged-spectrogram image, for representing the video frame associated with it, similarly to how the system does it on the visual query side.

In one example, video audio signatures and indexing as described above are provide as follows. Audio recorded from a microphone is often represented using the pulse-code modulation format, comprising a sequence of audio signal amplitude samples at equally spaced time intervals. These discrete samples approximate the actual continuous-time audio signal generated by physical phenomena and are often represented using signed integers or floating point numbers that lie in a particular range, e.g. [−32768, 32767]. The Nyquist sampling theorem in the signal processing literature indicates that the temporal spacing of the samples determines the highest possible frequency contained in the discrete signal, and that to represent a signal with maximum frequency of N hertz, 2*N samples per second can be used. Because humans typically cannot hear frequencies above 20,000 Hz, a common choice of samples per second is 44,100 audio samples/second, which allows for audio signal frequencies of up to 22,050 Hz, more than enough for human hearing.

Frequency-domain representation of the signal—an alternative to the time-domain. The well-known theory of Fourier analysis indicates that the audio signal samples can be viewed not just as a sequence of samples in time, but as a composition of canonical sinusoidal waveforms each corresponding to a different audio frequency. The original audio signal, in its discrete or continuous form, can be well approximated using a linear combination of a finite number of these waveforms.

A more compact representation of the signal via the frequency-domain. The audio signal can therefore be represented compactly as the linear coefficients of these waveforms, as well as the original samples, often referred to as the frequency domain, versus the original time domain representation. The process of converting a time-domain (audio) signal into a frequency-domain set of coefficients is often referred to as the Fourier transform. Specialized algorithms for the Fourier transform have been developed for discretely sampled signals (which is the usual representation for audio), allowing for very efficient computation of the Fourier transform from the time-domain signal.

Because the total number of audio samples tends to be much larger than the number of coefficients needed to represent the signal, the Fourier transform can effectively compress the signal dramatically while still retaining nearly all of the original signal information. Furthermore, it reveals the frequency content of the signal (in terms of power in each frequency component), useful information for matching of audio signals. The concise and descriptive nature of the frequency-domain representation makes it suitable for processing audio signals for the purposes of search and retrieval.

While a complete audio signal can be represented with a single set of frequency domain coefficients, it can be advantageous to compute such coefficients for local temporal neighborhoods of the signal in order to support common search tasks such as matching only a subset of the original audio signal (e.g., in cases where the query audio signal can be partially corrupted), or fast lookup of possible matches for an audio signal based on a smaller descriptor. For many possible subsets or windows of the audio signal (a smaller number of temporally consecutive audio samples), the Fourier transform components can be computed using a weighting over the samples in the window emphasizing samples near the center and discounting those further away. These windows maybe overlapping to avoid large fluctuations in the values between time steps. The result of this procedure can be a snapshot of the local frequency content at regular time intervals, often called a spectrogram.

As an example, the Fourier transform can be applied windows of the 256 samples in an audio signal with 44,100 samples/second where each window overlaps in 128 samples, producing one spectrogram approximately every 3 milliseconds.

Generally speaking, a spectrogram for a particular audio signal can be viewed as a function S: T×F→R, where T is a particular moment in time, F is a particular frequency band, and the result of the function is a real-valued number representing the power in frequency band F at time T. Note that the spectrogram can be viewed as a two-dimensional function, similar to an intensity image in computer vision. Intuitively, similar techniques used for indexing images can be applied to spectrograms, treating each one simply as an image.

Spectrogram to descriptor—given a spectrogram, the system can blur and subsample the spectrogram to remove redundant information and noise, leaving the system with a reduced spectrogram suitable for computing bit-wise descriptors. The descriptors represent the change in energy content in a particular frequency band between two consecutive time steps. If the amount of energy increased, the system can assign a bit as 1 and 0 otherwise. The system can also record the difference in energy that gave rise to the bit as additional information about the confidence of the bit. With this procedure, the system can transform a spectrogram with continuous values representing the power in different frequency bands at various time steps into a binary descriptor augmented by bit confidence information. Such a binary descriptor, comprised of ordinal statistics, has many useful properties, including being invariant to overall scaling of the spectrogram or adding a constant value to the energy levels.

Fast descriptor search and verification—for audio content to be searched, the above binary descriptors can be computed very efficiently (at least an order of magnitude faster than real-time), cut into constant-size pieces (such as 128-bit chunks), and stored in computer (e.g., in RAM). Specifically, the procedure of locality sensitive hashing as described above can be used to efficiently find possible good matches for a query descriptor (computed from a user-generated video file, for example). Given a possible correspondence of the query descriptor to the corpus, additional bits in the temporal neighborhood of the match of both the query and corpus descriptors can be examined to determine if this in fact a correct match. Additionally, some bits in certain frequency bands or with high bit difference tend to be better indicators of a correct match or not. These bits can be further emphasized by computing on a test corpus the probability P (descriptor bit i matched I the query-corpus match is correct), or P _i. Bits with high P _i that match can lend a higher boost to the verification score than bits with low P i or that don't match. The value P i can also depend on the bit difference associated with bit i, computed from the spectrogram. The P values can also be used to determine the best parameters for spectrogram blurring/subsampling; the goal is to have bits that are as discriminative as possible, and searching over multiple blurring/subsampling schemes, the system can discover which scheme provides bits with the best P_i.

Figure 16:
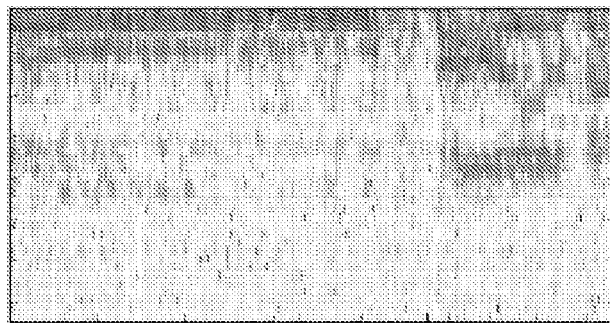
FIG. 16 depicts an example of a spectrogram of an 4-second audio signal.
Figure 17:
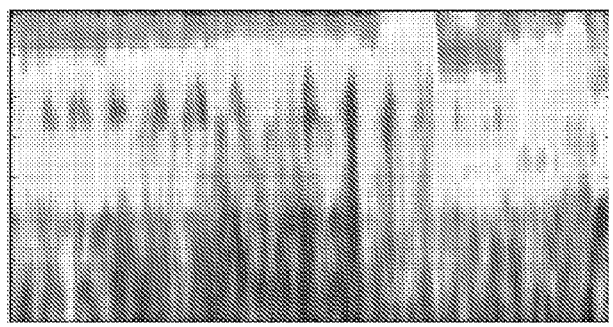
FIG. 17 depicts an example of a spectrogram after blurring.
Figure 18:
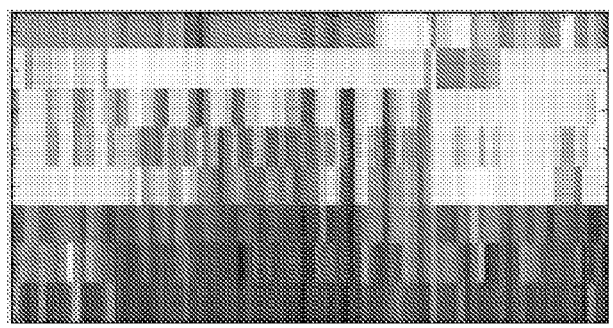
FIG. 18 depicts an example of the spectrogram after blurring and subsampling.
Figure 19:
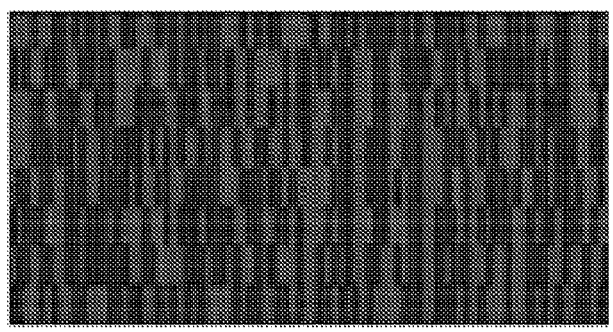
FIG. 19 depicts an example of a binary descriptor computed by comparing neighboring values from a spectrogram after blurring and subsampling.

FIG. 16 depicts an example of a spectrogram of an 4-second audio signal. FIG. 17 depicts an example of the spectrogram after blurring. FIG. 18 depicts an example of the spectrogram after blurring and subsampling. FIG. 19 depicts an example of a binary descriptor computed by comparing neighboring values from the spectrogram after blurring and subsampling. the lighter elements indicates a bit with value 1 and the darker elements indicates a bit with value 0. Bit difference information can be obtained from spectrogram after blurring and subsampling.

In one example, searching a corpus using query-frames includes looking for correct hits/videos as being among the ones which repeat as a multiple video result for a majority of the query-clips frame compared each against the entire ground truth corpus of signatures.

In matching each query-clip frame signature to the entire corpus of signatures the system can tune 'a match' so as to find the correct same frame with a probability higher than a certain percentage such as 96%, as well as match a few false positives. This can be done for efficiency reasons. When the system aggregates the matches for a few query frames the system can filter out the false positives while keeping the correct video hits.

Embodiments may include collecting signatures for the corpus, indexing the ground truth corpus of video frames in preparation for a fast signature-matching search as described. Embodiments may include building an index for searching efficiently: the system can organize the signatures into multiple layers. A first layer may be provided, for very fast matching, can include up to a first amount, such as 50M, of frame signatures and a second, for a slower but more comprehensive search, can store the other signatures. Using these two layers, the search can proceed in a coarse to fine manner with a first layer (direct match, no indexing): the system can keep in the fast, active memory (and cache) up to the first amount (e.g., 50 million) of ground-truth frame signatures to match with a query-clip using direct comparisons between the query signature and the corpus signatures. The number of identical bits can determine the similarity ('bit-count similarity', or accordingly the number of different bits is the 'bit-count (hamming) distance') between each two signatures, and hence between the respective frames they represent. The system can employ such a first layer of direct bit-count matches to cover a relatively small portion of the signature corpus (e.g., the 50 million signatures mentioned above, standing for about 650 video hours) which does not yet require the 'bit-window indexing." It is noted that this number can be increased without compromising performance by parallelizing such direct-memory bit-count matches on various different machines. By way of example, a first layer may be implemented by in-memory key-value relational database management systems, or NoSQL type management systems such as memcached, redis, hazelcast can be used.

A second-layer (searching a pre-made index) can be provided in case that the query clips cannot find a good match with clips in the first layer. The system can proceed to the second layer of searching through a pre-indexed signature corpus (e.g., using the bit-window method. This second layer is not required to be stored in memory and can include many more signatures than the first amount. Instead, it is loaded up to memory in parts, according to the query bit-window signature values. Upon loading the candidate signatures to the memory a direct bit-count match can be employed again, just like for the first layer. A second layer may be implemented by disk based key-value relational database management systems, or NoSQL management systems, HBase, SQL, etc. may be used.

Embodiments may include selecting a few query frames (and their respective signatures) from the visual query clip according to their goodness-of-signature, and trying multiple time-shifted averaged-spectrogram frames (and their respective signatures) from the audio query to account for multiple possible temporal alignments, in order to be used for the signature search against the entire ground truth signature corpus (and frames/videos).

Figure 20:
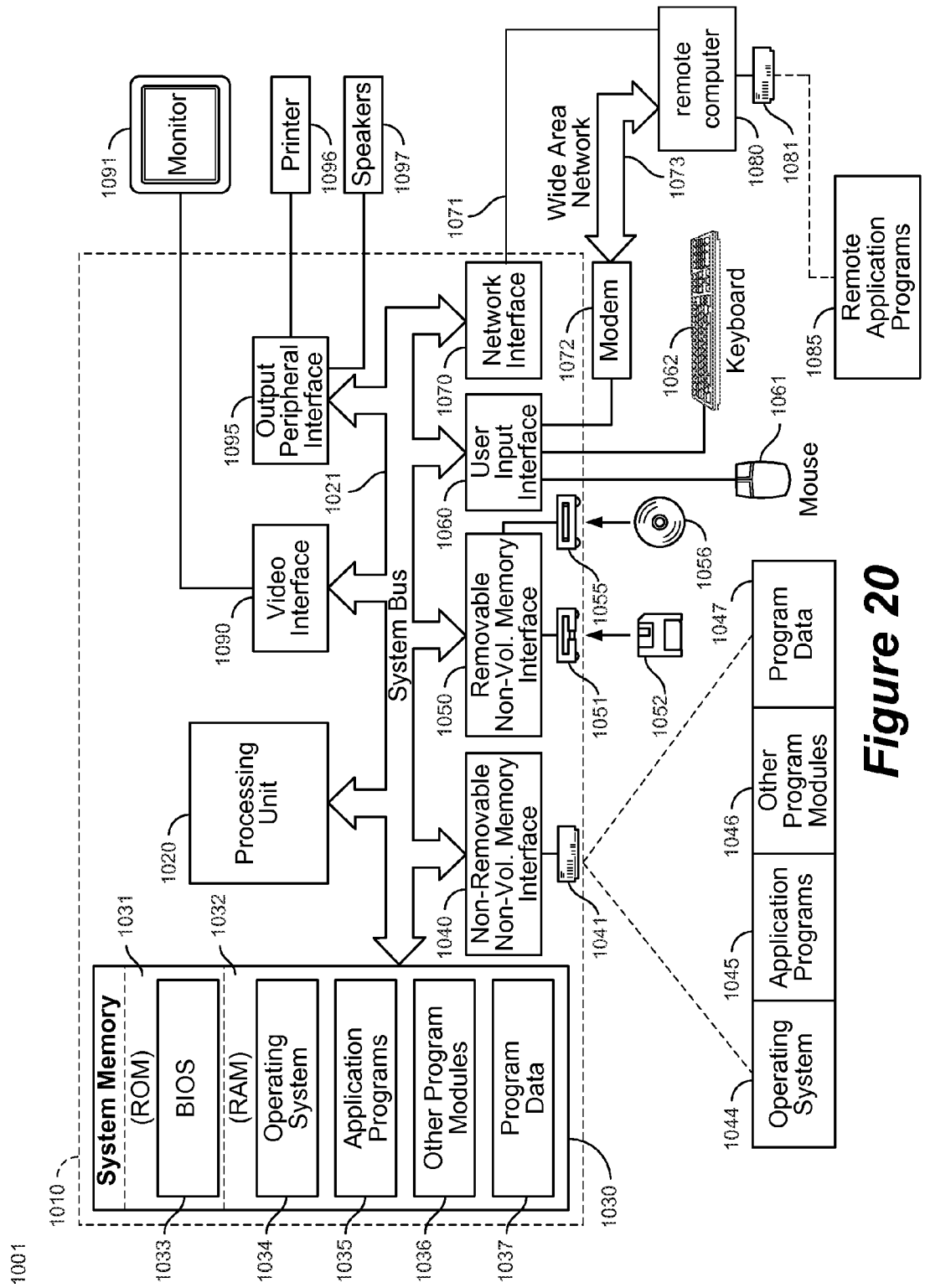
FIG. 20 is a block diagram of a computing system that can be used to implement components and perform methods of the disclosed technology.

With reference to FIG. 20, an exemplary system for implementing the various components of the described system and method may include a general purpose computing device 1010. Computing device 1010 may be used to implement all or a portion of any one the components in FIG. 1, such as the indexers, catalog, engines using any combination of machines. The computing device 1010 is only one example of a suitable computing system and is not intended to suggest any limitation as to the scope of use or functionality of the presently disclosed subject matter. Neither should the computing device be interpreted as having any dependency or requirement relating to any one or combination of components illustrated in the exemplary operating system. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 may include a variety of computer readable media. Computer readable media can be any available media that can be accessed by computer 1010 and includes both volatile and nonvolatile media, removable and non-removable media. By way of example, and not limitation, computer readable media may comprise computer readable storage media and communication media. Computer readable storage media includes volatile and nonvolatile, as well as removable and non-removable media implemented in any method or technology for storage of information such as computer readable instructions, data structures, program modules or other data. Computer readable storage media includes, but is not limited to, random access memory (RAM), read only memory (ROM), EEPROMs, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The system memory 1030 includes computer storage media in the form of volatile and/or nonvolatile memory such as ROM 1031 and RAM 1032. A basic input/output system (BIOS) 1033, containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disc drive 1041 that reads from or writes to non-removable, nonvolatile magnetic media and a magnetic disc drive 1051 that reads from or writes to a removable, nonvolatile magnetic disc 1052. Computer 1010 may further include an optical media reading device 1055 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 1041 is typically connected to the system bus 1021 through a non-removable memory interface such as interface 1040. Magnetic disc drive 1051 and optical media reading device 1055 are typically connected to the system bus 1021 by a removable memory interface, such as interface 1050.

The drives and their associated computer storage media discussed above provide storage of computer readable instructions, data structures, program modules and other data for the computer 1010. In FIG. 20, for example, hard disc drive 1041 is illustrated as storing operating system 1044, application programs 1045, other program modules 1046, and program data 1047. These components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and a pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 20. The logical connections depicted in FIG. 20 include a local window network (LAN) 1071 and a wide window network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communication over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communication link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A computer-readable storage medium having computer-readable instructions for programming a processor to perform a method of visual video identification for database generation, the method comprising:
    generating a first video node in a graph database for a first video source having first video content;
    identifying the first video content in a second video source based on visual fingerprint matching between the first video source and the second video source;
    generating in the graph database one or more first visual links between the first video node and a second video node for the second video source based on the visual fingerprint matching between the first video source and the second video source, the one or more first visual links indicating the first video content by storing a first time segment identifier for the first video source and a second time segment identifier for the second video source;
    generating in the graph database a second visual link between the second video node and a first card node corresponding to a first entity, the second visual link including at least one time segment identifier corresponding to at least one representation of the first entity in the second video source.

2. A computer-readable storage medium according to claim 1, wherein the one or more first visual links include:
    a first visual link having the first video node as its origination node and the second video node as its destination node, the first visual link storing the first time segment identifier; and
    a third visual link having the second video node as its origination node and the first video node as its destination node, the second visual link storing the second time segment identifier.

3. A computer-readable storage medium according to claim 1, wherein the method further comprises:
    generating the first card node in the graph database;
    identifying the at least one representation of the first entity in the second video source based on visual fingerprint matching between the second video source and the first entity; and
    wherein generating in the graph database the second visual link between the second video node and the first card node is based on visual fingerprint matching between the second video source and the first entity.

4. A computer-readable storage medium according to claim 3, wherein the method further comprises:
    receiving a text-based query;
    matching the text-based query to the first card node based on textual matching;
    identifying the second video node based on the second visual link between the second video node and the first card node; and
    generating a response to the text-based query based on the second video node and the second visual link to return information regarding the at least one representation of the first entity in the second video source.

5. A computer-readable storage medium according to claim 4, wherein the response to the text-based query includes:
    a uniform resource locator from the second video node for the second video source; and
    the at least one time segment identifier.

6. A computer-readable storage medium according to claim 1, wherein:
    the first time segment identifier includes a first start time and a first end time for the first video content in the first video source; and
    the second time segment identifier includes a second start time and a second end time for the first video content in the second video source.

7. A computer-readable storage medium according to claim 6, wherein the method further comprises:
    identifying second video content in the second video source that corresponds to second video content in the first video source based on the visual fingerprint matching between the first video source and the second video source; and
    generating the one or more first visual links to indicate the second video content in the first video source by storing a third time segment identifier for the first video source and to indicate the second video content in the second video source by storing a fourth time segment identifier for the second video source.

8. A computer-readable storage medium according to claim 1, wherein the method further comprises:
    generating a first metadata node in the graph database for a first metadata source; and generating one or more textual links between the first metadata node and the first video node based on textual matching between information from the first metadata source and information from the first video source.

9. A computing device, comprising:
a storage device comprising computer readable instructions; and
a processor in communication with the storage device, the processor executes the computer readable instructions to receive a text-based query, identify a card node in a graph database based on textual matching between the text-based query and the card node, identify from a plurality of visual links associated with the card node a set of visual links based on matching between the text-based query and the set of visual links, identify a first set of video nodes in the graph database associated with the set of visual links, and generate a response to the text-based query that includes information from the first set of video nodes based on visual fingerprint matching between the first set of video nodes and the card node.

10. A computing device according to claim 9, wherein the processor executes the computer readable instructions to:
receive a visual query from a first user;
generate one or more query signatures from the visual query;
identify a second set of video nodes based on query signature matching between the one or more query signatures and a base set of signatures.

11. A computing device according to claim 10, wherein the card node is a first card node, the processor executes the computer readable instructions to:
identify a second card node based on query signature matching between the one or more query signatures and the base set of signatures.

12. A computing device according to claim 9, wherein:
the processor executes the computer readable instructions to identify from a plurality of textual links associated with the card node a set of textual links based on matching between the text-based query and the plurality of textual links and to identify a second set of video nodes in the graph database associated with the set of textual links; and
the processor generates the response to include information from the second set of video nodes in response to the text-based query.

13. A computing device according to claim 12, wherein the processor executes the computer readable instructions to:
identify a second set of textual links based on matching between the text-based query and the plurality of textual links;
identify a first metadata node in the graph database associated with the second set of textual links;
identify from a second plurality of textual links that are associated with the first metadata node a third set of textual links based on matching between the text-based query and the second plurality of textual links;
identify a third set of video nodes in the graph database associated with the third set of textual links; and
wherein the response is generated to include information from the third set of video nodes in response to the text-based query.

14. A computing device according to claim 9, wherein the response to the text-based query includes for a first video node corresponding to a first video source, time segment information corresponding to a representation of an entity associated with the card node in the first video source.

15. A computer-implemented method of visually identifying video, comprising:
generating visual fingerprints for a plurality of frames of an unidentified video source, the visual fingerprint for each frame including an ordered bit representation of brightness for a predetermined number of cells of a corresponding frame;
generating for each visual fingerprint, a confidence measure for the ordered bit representation of each cell based on difference information for the cell; and
for each visual fingerprint, determining a value for a variable threshold based on the confidence measure for the ordered bit representation of each cell in the visual fingerprint; and
comparing each visual fingerprint to a base set of known visual fingerprints using the variable threshold.

16. A computer-implemented method according to claim 15, further comprising:
for each visual fingerprint, determining a probability measure of matching a corresponding known visual fingerprint in the base set using the confidence measure for the ordered bit representation;
wherein visual fingerprints with higher probability measures have higher values for the variable threshold than visual fingerprints with lower probability measures.

17. A computer-implemented method according to claim 16, further comprising:
if the probability measure for a given visual fingerprint is below a base probability measure, terminating the comparing to the base set of known visual fingerprints using the given visual fingerprint.

18. A computer-implemented method according to claim 17, further comprising:
dividing the visual fingerprints of the base set of known visual fingerprints into a number of subsets of visual fingerprints; and
determining the number of subsets of visual fingerprints based on the probability measure for each visual fingerprint.

19. A computer-implemented method according to claim 15, further comprising:
generating a first video node in a graph database for the unidentified video source;
matching content from the unidentified video source to content from a second video source based on comparing the visual fingerprints to the base set of known visual fingerprints;
generating a visual link in the graph database between the first video node and a second video node corresponding to the second video source, the visual link including at least one time segment identifier corresponding to the matching content in the unidentified video source and the second video source.

20. A computer-implemented method according to claim 19, further comprising:
matching content from the unidentified video source to an entity associated with a card node in the graph database based on visual fingerprint matching between the unidentified video source and visual fingerprints for the card node; and
generating a visual link in the graph database between the first video node and the card node, the visual link including at least one time segment identifier corresponding to a representation of the entity in the unidentified video source.

* * * * *